(12) United States Patent
Fukui et al.

(10) Patent No.: US 9,462,647 B2
(45) Date of Patent: Oct. 4, 2016

(54) LIGHTING DEVICE, HEAD LIGHT AND VEHICLE

(71) Applicant: Panasonic Intellectual Property Management Co., Ltd., Osaka (JP)

(72) Inventors: Takahiro Fukui, Osaka (JP); Toshifumi Tanaka, Osaka (JP); Kazutoshi Suganuma, Niigata (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/042,610

(22) Filed: Feb. 12, 2016

(65) Prior Publication Data
US 2016/0262232 A1    Sep. 8, 2016

(30) Foreign Application Priority Data
Mar. 2, 2015 (JP) .................................. 2015-040541

(51) Int. Cl.
| B60Q 1/02 | (2006.01) |
| H05B 33/08 | (2006.01) |
| B60Q 1/04 | (2006.01) |

(52) U.S. Cl.
CPC ............. *H05B 33/0842* (2013.01); *B60Q 1/04* (2013.01); *H05B 33/0815* (2013.01); *H05B 33/0824* (2013.01)

(58) Field of Classification Search
CPC   H05B 33/0842; H05B 37/03; H05B 37/036; B60Q 11/00
USPC ............................................. 315/76–77, 82
See application file for complete search history.

(56) References Cited

U.S. PATENT DOCUMENTS

| 2011/0260617 A1* | 10/2011 | Tanaka | H05B 33/0842 315/82 |
| 2013/0320850 A1* | 12/2013 | Nakamura | F21S 48/1747 315/82 |
| 2015/0069908 A1* | 3/2015 | Fukui | H05B 33/0815 315/82 |
| 2015/0069909 A1* | 3/2015 | Suganuma | H05B 33/089 315/82 |

FOREIGN PATENT DOCUMENTS

| JP | 2008-126958 A | 6/2008 |
| JP | 2011-233264 A | 11/2011 |
| JP | 2012-028184 A | 2/2012 |
| JP | 2013-229384 A | 11/2013 |
| JP | 2014-050112 A | 3/2014 |

* cited by examiner

*Primary Examiner* — Jason M Crawford
(74) *Attorney, Agent, or Firm* — Renner, Otto, Boisselle & Sklar, LLP

(57) ABSTRACT

A lighting device includes first to third output terminals, a power converter, a bypass switch, and a controller. A first light source is connected between the first and third output terminals. A second light source is connected between the second and third output terminals. The bypass switch is connected between the second and third output terminals. The controller switches the bypass switch between ON-state and OFF-state. The controller controls the power converter to adjust an output current. The controller includes a voltage meter for measuring a voltage corresponding to an output voltage of the power converter. The controller compares a measured voltage of the voltage meter with a first threshold voltage while keeping the bypass switch in OFF-state. The controller compares the measured voltage with a second threshold voltage while keeping the bypass switch in ON-state. The second threshold voltage is smaller than the first threshold voltage.

14 Claims, 12 Drawing Sheets

LIGHTING DEVICE, HEAD LIGHT AND VEHICLE

CROSS-REFERENCE TO RELATED APPLICATION

The present application is based upon and claims the benefit of priority of Japanese Patent Application No. 2015-040541, filed on Mar. 2, 2015, the entire contents of which are incorporated herein by reference.

TECHNICAL FIELD

The present disclosure relates to a lighting device, a headlight, and a vehicle.

BACKGROUND ART

JP2011-233264A discloses a conventional lighting device. This lighting device is configured to apply a DC (direct-current) voltage to a load (a light source), which is constituted by a series circuit of light-emitting diodes (LEDs), to operate (light) the light source. This lighting device includes a bypass switch to be connected in parallel to particular ones of the LEDs (some of the LEDs on a lower potential side). Accordingly, when the bypass switch is turned off, the lighting device operates (lights) all of the LEDs. On the other hand, when the bypass switch is turned on, the bypass switch acts as a short circuit between both ends of the particular ones of the LEDs, and thus the lighting device operates (lights) only the rest of the LEDs.

This conventional lighting device further includes a voltage measuring circuit for measuring a voltage (an output voltage) applied across the light source, a current measuring circuit for measuring a current flowing through the light source, and a failure detecting portion for determining, based on measuring results of these measuring circuits, whether failure has occurred. When determining that the output voltage is out of a predetermined normal range (10 to 40 V, for example), the failure detecting portion determines occurrence of failure and stops the operation of the lighting device. For example, abnormal increase in the output voltage may be caused by a breakdown of the bypass switch in an open mode (hereinafter referred to as "open circuit failure").

Apart from the case of the open circuit failure, the output voltage possibly increases abnormally due to another reason, such as a bad connection between connectors of the lighting device and the light source (the LEDs). It should be noted that in the case of the bad connection between the connectors, external factors such as vibration may cause a change in the connection state of the connectors between a state where the connectors are connected correctly and a state where the connectors are not connected correctly. In this regard, therefore, a voltage higher than a desired voltage may be applied to the light source when the connection state of the connectors recovers from the incorrectly connected state to the correctly connected state, and as a result of which the light source may be damaged or cause a failure.

SUMMARY

The present disclosure relates to a lighting device capable of detecting occurrence of an abnormal output voltage and suppressing occurrence of a failure, and a headlight, and a vehicle, including the lighting device.

A lighting device according to an aspect of the present disclosure is for lighting a DC light source including a first light source and a second light source. The lighting device includes: a first output terminal to be electrically connected to a first end of the first light source; a third output terminal to be electrically connected to a second end of the first light source and a first end of the second light source; a second output terminal to be electrically connected to a second end of the second light source; a power converter that includes a DC-DC converter and a pair of output ends electrically connected respectively to the first and second output terminals, and is configured to supply an output current from the DC-DC converter through the pair of output ends; a bypass switch electrically connected between the second and third output terminals; and a controller configured to switch the bypass switch between an ON-state and an OFF-state, and to control the power converter to adjust the output current of the power converter. The controller includes a voltage meter configured to measure a voltage corresponding to an output voltage of the power converter to output a measured voltage. The controller is configured to, while keeping the bypass switch in the OFF-state, compare the measured voltage of the voltage meter with a predetermined first threshold voltage, and stop operation of the power converter when determining that the measured voltage is equal to or greater than the first threshold voltage, and while keeping the bypass switch in the ON-state, compare the measured voltage of the voltage meter with a predetermined second threshold voltage, and stop the operation of the power converter when determining that the measured voltage is equal to or greater than the second threshold voltage. The second threshold voltage is smaller than a first rated voltage but larger than a second rated voltage, the first rated voltage corresponding to a rated value of the output voltage of the power converter under a condition where the bypass switch is kept in the OFF-state, the second rated voltage corresponding to a rated value of the output voltage of the power converter under a condition where the bypass switch is kept in the ON-state. The first threshold voltage is larger than the first rated voltage.

A headlight according to an aspect of the present disclosure includes the lighting device, a DC light source to be lit by electric power supplied from the lighting device, and a housing that houses the DC light source.

A vehicle according to an aspect of the present disclosure includes the headlight and a vehicle body in which the headlight is installed.

BRIEF DESCRIPTION OF DRAWINGS

The figures depict one or more implementations in accordance with the present teaching, by way of example only, not by way of limitations. In the figures, like reference numerals refer to the same or similar elements where.

DETAILED DESCRIPTION

Embodiments described below each relate generally to lighting devices, headlights, and vehicles, and more particularly, to a lighting device configured to light a light source, a headlight including the lighting device, and a vehicle including the headlight.

Embodiment 1

Figure 1:
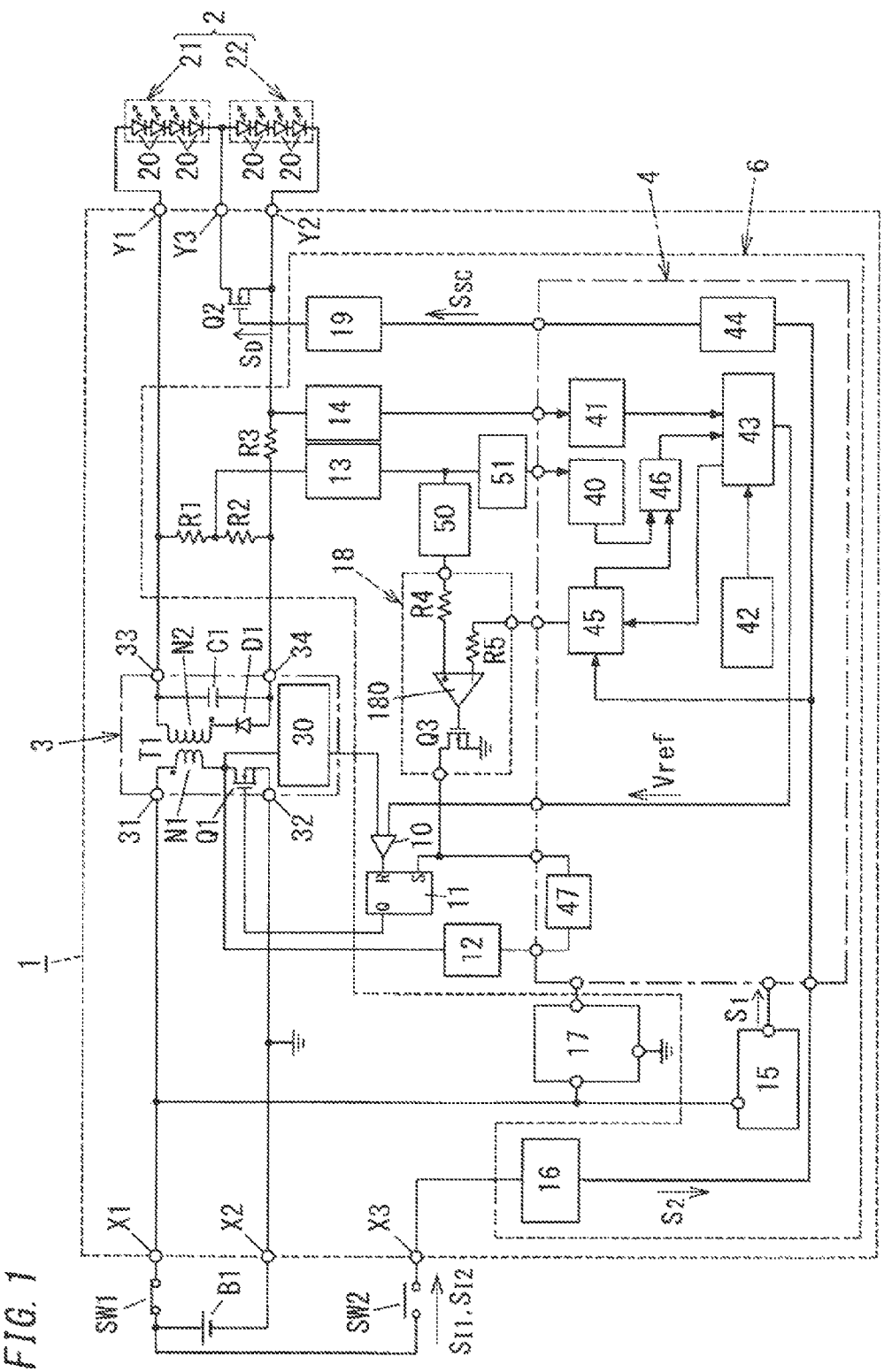
FIG. 1 is a circuit diagram of a lighting device according to Embodiment 1.

As shown in FIG. 1, a lighting device 1 according to Embodiment 1 includes a power converter 3, a bypass switch Q2, and a controller 6. The lighting device 1 is configured to supply a DC (direct-current) voltage and a DC current generated by the power converter 3 to a light source (DC light source) 2 to light the light source 2.

The light source 2 includes multiple (eight, in the example shown in FIG. 1) light emitting diodes (LEDs) 20 electrically connected in series. In the explanation below, a series circuit of four LEDs 20 on a high potential side, of the multiple LEDs 20 constituting the light source 2, is referred to as a first light source 21, and a series circuit of other four LEDs 20 on a low potential side, of the multiple LEDs 20 is referred to as a second light source 22.

The lighting device 1 and the light source 2 of the present embodiment are adapted for a headlight equipped on a vehicle such as an automobile, for example. The first light source 21 may be used as a low-beam headlight. A combination of the first light source 21 and the second light source 22 may be used as a main (high-beam) headlight.

The lighting device 1 of the present embodiment includes three input terminals (a first input terminal X1, a second input terminal X2, and a third input terminal X3), and three output terminals (a first output terminal Y1, a second output terminal Y2, and a third output terminal Y3).

The first input terminal X1 is to be electrically connected to a positive electrode of a (external) DC power source B1 via a first switch SW1. The second input terminal X2 is to be electrically connected to a negative electrode of the DC power source B1. The third input terminal (signal input terminal) X3 is to be electrically connected to the positive electrode of the DC power source B1 via a second switch SW2. That is, the DC power source B1 is to be electrically connected between the first input terminal X1 and the second input terminal X2 (via the first switch SW1).

In the present embodiment, the DC power source B1 is a battery equipped on the vehicle. The first switch SW1 and the second switch SW2 are situated on particular places of the vehicle where a driver can easily operate them, for example, around a driver's sheet.

The first output terminal Y1 is to be electrically connected to a positive electrode of the first light source 21 (an anode of an LED 20 on the highest potential side in the first light source 21; a first end of the first light source 21). The second output terminal Y2 is to be electrically connected to a negative electrode of the second light source 22 (a cathode of an LED 20 on the lowest potential side in the second light source 22; a second end of the second light source 22). The third output terminal Y3 is to be electrically connected to a negative electrode of the first light source 21 (a cathode of an LED 20 on the lowest potential side in the first light source 21; a second end of the first light source 21) and a positive electrode of the second light source 22 (an anode of an LED 20 on the highest potential side in the second light source 22; a first end of the second light source 22). In other words, the first light source 21 is to be electrically connected between the first output terminal Y1 and the third output terminal Y3. The second light source 22 is to be electrically connected between the third output terminal Y3 and the second output terminal Y2.

The power converter 3 includes a flyback DC-DC converter. The power converter 3 includes an insulated transformer T1 (a primary winding N1 and a secondary winding N2), a first switching element Q1, a diode D1, a capacitor C1, and a primary current meter 30.

The primary winding N1 of the insulated transformer T1 has a winding start end (a dotted end, hereinafter referred to as a "first end") electrically connected to the first input terminal X1, and a winding finish end (hereinafter referred to as a "second end") electrically connected to the second input terminal X2 via the first switching element Q1. The secondary winding N2 of the insulated transformer T1 has a winding start end (a dotted end, hereinafter referred to as a "first end") electrically connected to the second output terminal Y2 via the diode D1 and a resistor (shunt resistor) R3 for current measurement, and a winding finish end (hereinafter referred to as a "second end") electrically connected to the first output terminal Y1. The diode D1 has a cathode electrically connected to the first end of the secondary winding N2, and an anode electrically connected to the resistor R3. The capacitor C1 is electrically connected between the second end of the secondary winding N2 and the anode of the diode D1.

The first switching element Q1 is constituted by an N-channel enhancement-type Metal-Oxide-Semiconductor Field Effect Transistor (MOSFET). The first switching element Q1 has a drain electrode (a first electrode) electrically connected to the second end of the primary winding N1, and a source electrode (a second electrode) electrically connected to the second input terminal X2. The source electrode of the first switching element Q1 is connected to a ground.

In the present embodiment, the first end of the primary winding N1 and the source electrode of the first switching element Q1 serve as a pair of input ends 31 and 32 of the power converter 3, respectively. Both ends of the capacitor C1 serve as a pair of output ends 33 and 34 of the power converter 3. The two input ends 31 and 32 of the power converter 3 are electrically connected to the first and second input terminals X1 and X2, respectively. The output end 33 of the power converter 3 is electrically connected to the first output end Y1. The output end 34 of the power converter 3 is electrically connected to the second output terminal Y2 via the resistor R3.

The primary current meter 30 is electrically connected to a junction of the second end of the primary winding N1 and the drain electrode of the first switching element Q1. The primary current meter 30 is configured to measure a current (primary current) flowing through the first switching element Q1 by measuring a drain-source voltage of the first switching element Q1 (namely, by measuring an electric potential of the junction).

Whether to supply the DC voltage and DC current from the DC power source B1 to the power converter 3 is determined in accordance with an ON state and an OFF state of the first switch SW1. Specifically, the DC voltage and the DC current are allowed to be supplied from the DC power source B1 to the power converter 3 while the first switch SW1 is on. The DC voltage and the DC current are prevented to be supplied from the DC power source B1 to the power converter 3 while the first switch SW1 is off. In the power converter 3, by the first switching element Q1 being periodically turned on and off, a DC voltage (an output voltage) is generated across the capacitor C1 (between the output ends 33 and 34 of the power converter 3).

Specifically, during a period in which the first switching element Q1 is on, energy is accumulated in the transformer T1 and a current flowing through the primary winding N1 of the transformer T1 gradually increases. During a period in which the first switching element Q1 is off, the accumulated energy is discharged from the secondary winding N2 of the transformer T1 and the capacitor C1 is charged by a regeneration current flowing through the diode D1.

The bypass switch Q2 is constituted by an N-channel enhancement-type MOSFET. The bypass switch Q2 is electrically connected between the second output terminal Y2 and the third output terminal Y3. The bypass switch Q2 has a drain electrode (a first electrode) electrically connected to the third output terminal Y3, and a source electrode (a second electrode) electrically connected to the second output terminal Y2. In other words, the bypass switch Q2 is to be electrically connected in parallel to the second light source 22 (electrically connected between both ends of the second light source 22). The bypass switch Q2 has: a short-circuited state (an ON-state) for creating an electric path bypassing the second light source 22 to prevent an output current of the power converter 3 to flow through the second light source 22; and an open state (an OFF-state) allowing the output current to flow through the second light source 22. The bypass switch Q2 is turned on when a gate electrode (a control electrode) thereof receives a drive signal $S_D$ from the driver 19. When the bypass switch Q2 is in the ON-state, the positive and negative electrodes of the second light source 22 are short-circuited, and thus the output current of the power converter 3 does not flow through the second light source 22. As a result, only the first light source 21 can be operated (emit light). When the bypass switch Q2 is in the OFF-state, the output current of the power converter 3 is allowed to flow through the series circuit of the first and second light sources 21 and 22, and thus both the first and second light sources 21 and 22 can be operated (emit light).

As shown in FIG. 1, the controller 6 includes a comparator 10, a sequential circuit 11, and a differentiation circuit 12.

The comparator 10 has a first input end electrically connected to an output end of the primary current meter 30, a second input end electrically connected to a processor 4, and an output end. The comparator 10 is configured to output a high-level output (voltage signal) from the output end while a voltage input to the first input end is higher than a voltage input to the second input end, and to output a low-level output from the output end while a voltage input to the first input end is lower than a voltage input to the second input end.

The sequential circuit 11 is composed of a set-reset flip-flop circuit, and has a reset terminal electrically connected to the output end of the comparator 10, a set terminal electrically connected to the processor 4, and an output terminal electrically connected to a gate electrode (a control electrode) of the first switching element Q1.

The differentiation circuit 12 has an input end electrically connected to the junction of the primary winding N1 and the first switching element Q1, and an output end electrically connected to the processor 4.

Hereinbelow, an operation of the power converter 3 is explained. When the first switching element Q1 is turned on, a current (an excitation current) flows through the primary winding N1 of the transformer T1. When the excitation current flows, an ON resistance of the first switching element Q1 causes a voltage drop, and this lead to rise of the drain-source voltage of the switching element Q1 to a high-level. The primary current meter 30 of the power converter 3 measures the primary current flowing through the primary winding N1 of the transformer T1. The primary current meter 30 is configured to measure the drain-source voltage of the first switching element Q1, thereby indirectly measuring the excitation current. The primary current meter 30 outputs a measured voltage (a voltage proportional to the excitation current) to the comparator 10.

The comparator 10 compares the measured voltage of the primary current meter 30 with a reference voltage Vref (described later) supplied from the processor 4, and to output a high-level output when the measured voltage is higher than the reference voltage. The output of the comparator 10 is supplied to the reset terminal of the sequential circuit 11. Specifically, when the measured voltage of the primary current meter 30 is greater than the reference voltage $V_{ref}$, the input voltage to the reset terminal of the sequential circuit 11 rises to a high-level, and thus the sequential circuit 11 outputs a low-level output (voltage signal). The output of the sequential circuit 11 is supplied to the gate electrode of the first switching element Q1. Therefore, the first switching element Q1, receiving the low-level output of the sequential circuit 11, is turned off.

When the first switching element Q1 is turned off, the energy accumulated on the primary winding N1 of the transformer T1 is discharged to the secondary side. When the discharge of the energy finishes, the drain-source voltage of the first switching element Q1 falls to a low-level. The falling edge of the drain-source voltage is detected by the processor 4 (ON-pulse generation section 47) via the differential circuit 12. Upon detecting the falling edge of the drain-source voltage via the differentiation circuit 12, the processor 4 (the ON-pulse generation section 47) outputs a pulse signal to the set terminal of the sequential circuit 11. Upon the input voltage to the set terminal rising to a high-level by the pulse signal from the processor 4, the sequential circuit 11 outputs a high-level output to turn on the first switching element Q1 again. Therefore, the power converter 3 of the present embodiment is controlled in accordance with a Boundary Current Mode.

The lighting device 1 is configured to, in a normal state, execute a constant current control of keeping a current flowing through the light source 2 constant, to thereby light the light source 2. The constant current control is executed by the controller 6 including the processor (microcontroller) 4 as a main component. The controller 6 further includes a voltage meter 13, a current meter 14, resistors R1 to R3, and a driver 19, as shown in FIG. 1.

As shown in FIG. 1, a series circuit of the voltage divider resistors R1 and R2 is electrically connected between the first and second output terminals Y1 and Y2 (between the output ends 33 and 34 of the power converter 3). Also, the resistor R3 for current measurement is electrically connected between the output end 34, on a low potential side, of the power converter 3 (a junction of the anode of the diode D1 and the capacitor C1) and the second output terminal Y2. Specifically, the resistor R3 is electrically connected between a junction of the output end 34 of the power converter 3 and the series circuit of the resistors R1 and R2, and the second output terminal Y2.

The voltage meter 13 of the lighting device 1 is configured to measure a divided voltage of the output voltage of the power converter 3 (a first measurement voltage) obtained by dividing the output voltage of the power converter 3 by the voltage divider resistors R1 and R2, and to output, to the processor 4, the first measurement voltage corresponding to the output voltage of the power converter 3. The current meter 14 of the lighting device 1 is configured to measure a voltage across the resistor R3 (a second measurement voltage) that corresponds to a current supplied from the lighting device 1 to the light source 2 (an output current of the power converter 3), and to output the second measurement voltage to the processor 4.

The processor 4 executes various programs with a built-in central processing unit (CPU) to realize various functions. The processor 4 includes a built-in or an external memory storing such programs. As shown in FIG. 1, the processor 4 in the present embodiment includes a first averaging section 40, a second averaging section 41, a current instruction section 42, a comparison operation section 43, a switch control section 44, a threshold output section 45, an abnormal state determining section 46, and the ON-pulse generation section 47 (these sections represent functions of program modules realized by the hardware components of the processor 4).

The first averaging section 40 is configured to calculate an average of the first measurement voltage supplied from the voltage meter 13. For example, the first averaging section 40 is configured to perform analog-digital conversion of the first measurement voltage to obtain a corresponding first measurement voltage value, and to calculate a moving average of the first measurement voltage value.

The second averaging section 41 is configured to calculate an average of the second measurement voltage supplied from the current meter 14. For example, the second averaging section 41 is configured to perform analog-digital conversion of the second measurement voltage to obtain a corresponding second measurement voltage value, and to calculate a moving average of the second measurement voltage value.

The current instruction section 42 is configured to read out a target value of the output current from the memory of the processor 4, and to send the target value to the comparison operation section 43.

The comparison operation section 43 is configured to compare the average value of the output current (specifically the average value of the second measurement voltage value) obtained by the second averaging section 41 with the target value supplied from the current instruction section 42, and to calculate a primary current instruction value based on a difference between the target value and the average value. For example, the comparison operation section 43 is configured to generate a comparatively small primary current value when the average value is larger than the target value, and to generate a comparatively large primary current value when the average value is smaller than the target value. The processor 4 is configured to perform digital-analog conversion of the primary current instruction value generated by the comparison operation section 43 to generate a reference voltage $V_{ref}$, and to output the reference voltage $V_{ref}$ to the comparator 10.

The reference voltage $V_{ref}$ is decreased with a decrease in the primary current instruction value, and hence the ON-period of the first switching element Q1 is shortened, and as a result the output current decreases. The reference voltage $V_{ref}$ is increased with an increase in the primary current instruction value, and hence the ON-period of the first switching element Q1 is prolonged, and as a result the output current increases. With this procedure, the processor 4 controls the switching element Q1 to realize the constant current control on the power converter 3. In other words, the processor 4 performs a feedback control by adjusting (changing) the primary current instruction value (the reference voltage $V_{ref}$) so that the magnitude of the current supplied to the light source 2 is kept equal to the target value of the current instruction section 42.

The switch control section 44 is configured to output a switch control signal $S_{SC}$ according to a detection result of a second power supply detector 16. The second power supply detector 16 has an input end electrically connected to the third input terminal X3, and an output end electrically connected to the processor 4. The second power supply detector 16 is configured to output a second detection signal $S_2$ while a voltage of the third input terminal X3 (difference in potential between the ground and the third input terminal X3) is equal to or greater than a predetermined threshold voltage, and not output the second detection signal $S_2$ while the voltage of the third input terminal X3 is lower than the predetermined threshold voltage. In other words, the second power supply detector 16 detects an ON-state and an OFF-state of the second switch SW2 based on a comparison result between the voltage of the third input terminal X3 and the predetermined threshold voltage. The switch control section 44 does not output the switch control signal $S_{SC}$ while the second detection signal S2 is supplied from the second power supply detector 16, whereas the switch control section 44 outputs the switch control signal $S_{SC}$ while the second detection signal S2 is not supplied from the second power supply detector 16. The driver 19 outputs a drive signal $S_D$ to the gate electrode of the bypass switch Q2 to turn on the bypass switch Q2 while the switch control signal $S_{SC}$ is supplied. The driver 19 does not output the drive signal $S_D$ to turn off the bypass switch while the switch control signal $S_{SC}$ is not supplied.

In short, the bypass switch Q2 is kept off by the processor 4 while the second switch SW2 is on. In this case, both the first light source 21 and the second light source 22 are allowed to be lit. The bypass switch Q2 is kept on by the processor 4 while the second switch SW2 is off. In this case, only the first light source 21 is allowed to be lit.

In other words, the third input terminal (signal input terminal) X3 is configured to receive a first instruction signal $S_{I1}$ and a second instruction signal $S_{I2}$. The controller 6 is configured to keep the bypass switch Q2 off while the first instruction signal $S_{I1}$ is supplied through the third input terminal X3 (while the voltage of the third input terminal X3 is equal to or greater than the predetermined threshold voltage; while the second detection signal $S_2$ is supplied from the second power supply detector 16 to the processor 4). The controller 6 is configured to keep the bypass switch Q2 on while the second instruction signal $S_{I2}$ is supplied through the third input terminal X3 (while the voltage of the third input terminal X3 is smaller than the predetermined threshold voltage; while the second detection signal $S_2$ is not supplied from the second power supply detector 16 to the processor 4).

The ON-pulse generation section 47 is configured to output a pulse signal to the set terminal of the sequential circuit 11 upon detecting the falling edge of the drain-source voltage of the first switching element Q1 through the differentiation circuit 12. The ON-pulse generation section 47 of the present embodiment is configured to also output a pulse signal to the set terminal of the sequential circuit 11 when a predetermined suspension time elapses after outputting a pulse signal last time (namely, configured to output the pulse signal every time the suspension time elapses). With this configuration, the first switching element Q1 can be turned on even if the processor 4 fails to detect the falling edge of the drain-source voltage due to failure of the differentiation circuit 12, for example.

Preferably, the processor 4 is configured to determine whether to start the operation of the power converter 3, based on a voltage measured by a first power supply detector 15. The first power supply detector 15 has an input end electrically connected to the first input terminal X1, and an output end electrically connected to the processor 4. The first power supply detector 15 is configured to measure a voltage of the first input terminal X1 (difference in potential between the first input terminal X1 and the second input terminal X2 (ground)), and to output, to the processor 4, a first detection signal $S_1$ indicative of the measured voltage. Preferably, the processor 4 starts the operation of the power converter 3 when a signal level of the first detection signal $S_1$ is within a predetermined operation permitted range, and does not start the operation of the power converter 3 when the signal level of the first detection signal $S_1$ is out of the predetermined operation permitted range.

The processor 4 operates with a control power voltage generated by a control power generator 17. The control power generator 17 is configured to generate the control power voltage using the DC voltage supplied from the DC power source B1 through the first switch SW1.

In the activation process of the lighting device 1, the first switch SW1 is turned on, and the control power voltage is generated by the control power generator 17, and then the processor 4 is activated with the control power voltage. If the signal level of the first detection signal $S_1$ from the first power supply detector 15 is within the operation permitted range, the processor 4 outputs a pulse signal to the set terminal of the sequential circuit 11 from the ON-pulse generation section 47. Switching operation of the first switching element Q1 (operation of the power converter 3) is thus started.

As shown in FIG. 1, the lighting device 1 of the present embodiment includes an interrupter 18. The interrupter 18 includes a comparator 180, input resistors R4 and R5, and a third switching element Q3.

The comparator 180 has a non-inverting input terminal (a first terminal) to receive the first measurement voltage from the voltage meter 13 through the input resistor R4. The comparator 180 has an inverting input terminal (a second terminal) to receive an excess-voltage threshold (a first type threshold) from the threshold output section 45 of the processor 4. The comparator 45 is configured to compare the first measurement voltage with the excess-voltage threshold. The comparator 45 outputs a high-level output (voltage signal) while the first measurement voltage is equal to or greater than the excess-voltage threshold, and outputs a low-level output while the first measurement voltage is less than the excess-voltage threshold.

The third switching element Q3 is constituted by an N-channel enhancement-type (normally off type) MOSFET. The third switching element Q3 has a drain electrode (a first electrode) electrically connected to the set terminal of the sequential circuit 11, a source electrode (a second electrode) electrically connected to the ground, and a gate electrode (a control electrode) electrically connected to an output terminal of the comparator 180.

While the output of the comparator 180 is in a low-level, the third switching element Q3 is kept in an OFF-state. The pulse signal from the processor 4 is therefore allowed to be input to the set terminal of the sequential circuit 11. While the output of the comparator 180 is in a high-level (while the first measurement voltage is equal to or greater than the excess-voltage threshold), the third switching element Q3 is on. In this case, the set terminal of the sequential circuit 11 is grounded through the third switching element Q3, and thus the pulse signal from the processor 4 cannot be supplied to the set terminal of the sequential circuit 11. Therefore, the output of the sequential circuit 11 is not switched to the high-level. As a result, the first switching element Q1 is kept turned off and the operation of the power converter 3 is stopped.

The lighting device 1 includes the interrupter 18, and accordingly it is possible to prevent an excess increase in the output voltage of the power converter 3.

Incidentally, when the first switching element Q1 is turned off, the first measurement voltage (the output voltage of the power converter 3) gradually decreases. When the first measurement voltage decreases and becomes less than the excess-voltage threshold, the output of the comparator 180 is switched to the low-level (therefore, the third switching element Q3 is turned off). As described above, the processor 4 of the present embodiment is configured to output a pulse signal when the predetermined suspension time elapses from a time when the processor 4 outputs a pulse signal last time, even if the processor 4 fails to detect the falling edge of the drain-source voltage. Therefore, after the output of the interrupter 18 is switched to the low-level, the first switching element Q1 is turned on again by a pulse signal from the processor 4. The output of the interrupter 18 is therefore repeatedly switched between the high-level and the low level until a cause of an increase in the output voltage of the power converter 3, such as an open circuit failure of the light source 2, is resolved. Therefore, the output voltage of the power converter 3 is maintained around a particular voltage (an excess voltage) at which the first measurement voltage equals to the excess-voltage threshold.

The excess voltage of the output voltage of the power converter 3 possibly causes a continuous severe stress on the light source 2, the bypass switch Q2, the processor 4, and the like. In view of this, the processor 4 of the present embodiment includes the abnormal state determining section 46. The abnormal state determining section 46 is configured to compare the average of the first measurement voltage from the first averaging section 40 with a high-voltage threshold (second type threshold) from the threshold output section 45, and to count (measure) a time during which the average of the first measurement voltage is kept equal to or greater than the high-voltage threshold, as a duration time. When the duration time reaches predetermined upper limit time (150 ms, for example), the abnormal state determining section 46 (the processor 4) performs a process for terminating the operation of the power converter 3. For example, the abnormal state determining section 46 may cause the comparison operation section 43 to generate a primary current instruction value of around 0. As a result, the first switching element Q1 is kept in the OFF-state. With this configuration, the processor 4 can stop the operation of the power converter 3 without delay when a voltage (an excess voltage) higher than a rated voltage of the light source 2 is continuously applied to the light source 2, and thus can protect the light source 2, the bypass switch Q2, the processor 4, and the like.

As shown in FIG. 1, preferably, the lighting device 1 includes a first filter 50 and a second filter 51. The first filter 50 is interposed between the voltage meter 13 and the interrupter 18. The second filter 51 is interposed between the voltage meter 13 and the processor 4 (the first averaging section 40). Preferably, each of the first filter 50 and the second filter 51 is constituted by a low-pass filter, and is configured to remove harmonic noise component contained in the first measurement voltage of the voltage meter 13. The first measurement voltage is filtered by the first filter 50, and is supplied to the interrupter 18. The first measurement voltage is also filtered by the second filter 51, and is supplied to the first averaging section 40. Preferably, a time constant of the low-pass filter of the first filter 50 is sufficiently smaller than a time constant of the low-pass filter of the second filter 51. The processor 4 averages the first measurement voltage by the first averaging section 40, and further the duration time during which the average of the first measurement voltage is equal to or greater than the high-voltage threshold is counted. Therefore, it is preferable that the time constant of the low-pass filter of the second filter 51 be set to be comparatively large, with emphasis on a noise reduction property rather than a responsibility. Contrary, regarding the interrupter 18, the time constant of the low-pass filter of the first filter 50 is preferably set to be comparatively small, with emphasis on the responsibility rather than the noise reduction property.

Incidentally, in a case where an increase in the output voltage of the power converter 3 is caused by a bad connection between any of the output terminals Y1 to Y3 of the lighting device 1 and the light source 2, a connection state may be changed between a correct connection state and an incorrect connection state due to external factors such as vibration. In this case, if the connection state recovers from the incorrect connection state to the correct connection state before the duration time during which the average of the first measurement voltage is equal to or greater than the high-voltage threshold reaches the upper limit, an excess voltage (a voltage at which the first measurement voltage equals to the excess-voltage threshold, for example) higher than the rated voltage of the light source 2 would be applied to the light source 2. As a result, a rush current depending on a difference between the excess voltage and the rated voltage may flow into the LEDs 20. In other words, after an increase in the output voltage of the power converter 3 resulting from a disconnection of the light source 2 from any of the output terminals Y1 to Y3, when the light source 2 is correctly connected to the output terminals Y1 to Y3, an excess voltage higher than the rated voltage may be applied to the light source 2. Particularly, in a configuration in which the excess-voltage threshold is set to be greater than the sum of rated voltages of the light sources 21 and 22 and in a case where only the first light source 21 is turned on (in a case where the bypass switch Q2 is turned on), if a connection state recovers to the correct connection state from the incorrect connection state, a significantly large rush current possibly flows into the first light source 21 and the bypass switch Q2.

In view of the above, the lighting device 1 of the present embodiment is configured to change the excess-voltage threshold depending on whether the current state is a state where only the first light source 21 is allowed to be lit (hereinafter, referred to as "low-beam state") or a state where both the first and second light sources 21 and 22 are allowed to be lit (hereinafter, referred to as "main-beam state"). Specifically, the threshold output section 45 of the processor 4 sets a first threshold voltage TH1 as the excess-voltage threshold while the second detection signal $S_2$ is supplied (in the main-beam state; while the first instruction signal $S_{f1}$ is supplied), and sets a second threshold voltage TH2 (<the first threshold voltage TH1) as the excess-voltage threshold while the second detection signal $S_2$ is not supplied (in the low-beam state; while the second instruction signal $S_{f2}$ is supplied). The first threshold voltage TH1 is set to be larger than the sum of the rated voltages of the light sources 21 and 22. The second threshold voltage TH2 is set to be larger than the rated voltage of the first light source 21 but smaller than the sum of the rated voltages of the light sources 21 and 22. In a specific example in which the rated voltages of the light sources 21 and 22 are each 15±3 [V], the first threshold voltage TH1 may be set to 41×(a division ratio of the voltage divider resistors R1 and R2) [V], and the second threshold voltage TH2 may be set to 23×(the division ratio of the voltage divider resistors R1 and R2) [V]. The division ratio of the voltage divider resistors R1 and R2 may be defined as r2/(r1+r2), where r1 and r2 denote resistance values of the resistors R1 and R2, respectively. However, the first threshold voltage TH1 and the second threshold voltage TH2 are not limited thereto.

Preferably, the threshold output section 45 changes not only the excess-threshold but also the high-voltage threshold depending on whether the current state is the low-beam state or the main-beam state. Specifically, the threshold output section 45 sets a third threshold voltage TH3 as the high-voltage threshold in the main-beam state, and sets a fourth threshold voltage TH4 (<the third threshold voltage TH3) as the high-voltage threshold in the low-beam state, preferably. The third threshold voltage TH3 is set to be larger than the sum of the rated voltages of the light sources 21 and 22 but smaller than the first threshold voltage TH1. The fourth threshold voltage TH4 is set to be larger than the rated voltage of the first light source 21 but smaller than the second threshold voltage TH2. In the specific example in which the rated voltages of the light sources 21 and 22 are each 15±3 [V], the first threshold voltage TH1 is set to 41×(the division ratio of the voltage divider resistors R1 and R2) [V], and the second threshold voltage TH2 is set to 23×(the division ratio of the voltage divider resistors R1 and R2) [V], the third threshold voltage TH3 may be set to 38×(the division ratio of the voltage divider resistors R1 and R2) [V], and the fourth threshold voltage TH4 may be set to 20×(the division ratio of the voltage divider resistors R1 and R2) [V]. However, the first to fourth threshold voltages TH1 to TH4 are not limited thereto.

Figure 2:
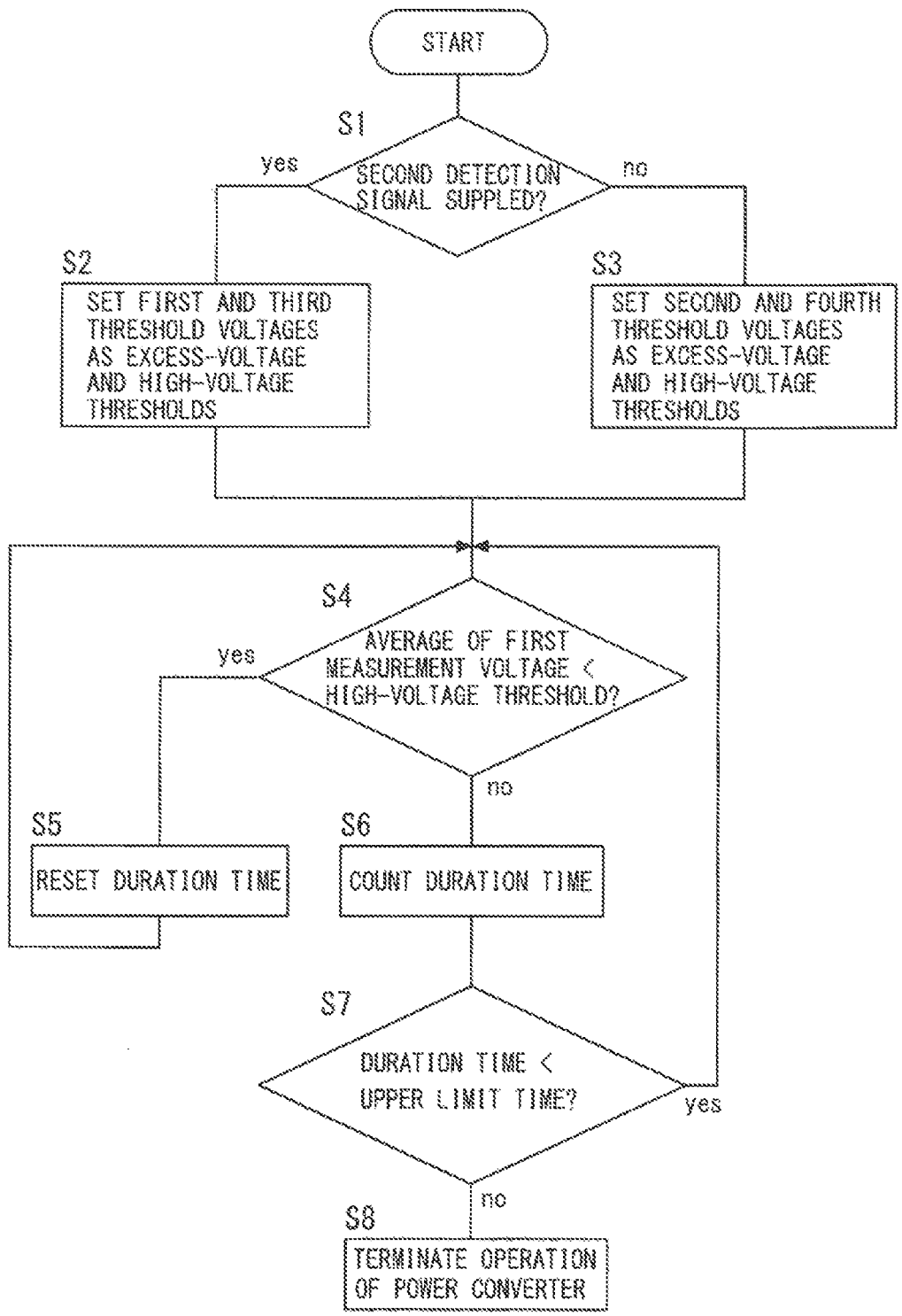
FIG. 2 is a flow chart of an operation of the lighting device.

With reference to the flow chart of FIG. 2 and the time chart of FIG. 3, an operation of the lighting device 1 of the present embodiment (particularly, an operation of the lighting device 1 in a case where the open circuit failure occurs in the light source 2 and this leads to an increase in the output voltage of the power converter 3) will be explained. FIG. 2 shows a flow chart illustrating the operation (processing) of the processor 4.

When the first switch SW1 is turned on (t=t1 in FIG. 3), the processor 4 starts performing the constant current control for keeping the output current of the power converter 3 equal to the target value (corresponding to a rated current of the light source 2) based on the above-described manner. The processor 4 always monitors whether the second detection signal S₂ is present or absent (whether the signal has the high-level or the low-level) (S1 in FIG. 2). While the second detection signal S₂ is supplied to the processor 4 (while the first instruction signal $S_{f1}$ is supplied), the threshold output section 45 sets the first threshold voltage TH1 as the excess-voltage threshold and sets the third threshold voltage TH3 as the high-voltage threshold (S2 in FIG. 2). When no fault occurs in the light source 2 and the lighting device 1, the output voltage of the power converter 3 is kept at a voltage (a first rated voltage) which is equal to the sum of the rated voltages of the first and second light sources 21 and 22 as well as smaller than the third threshold voltage TH3 (see FIG. 3).

Figure 3:
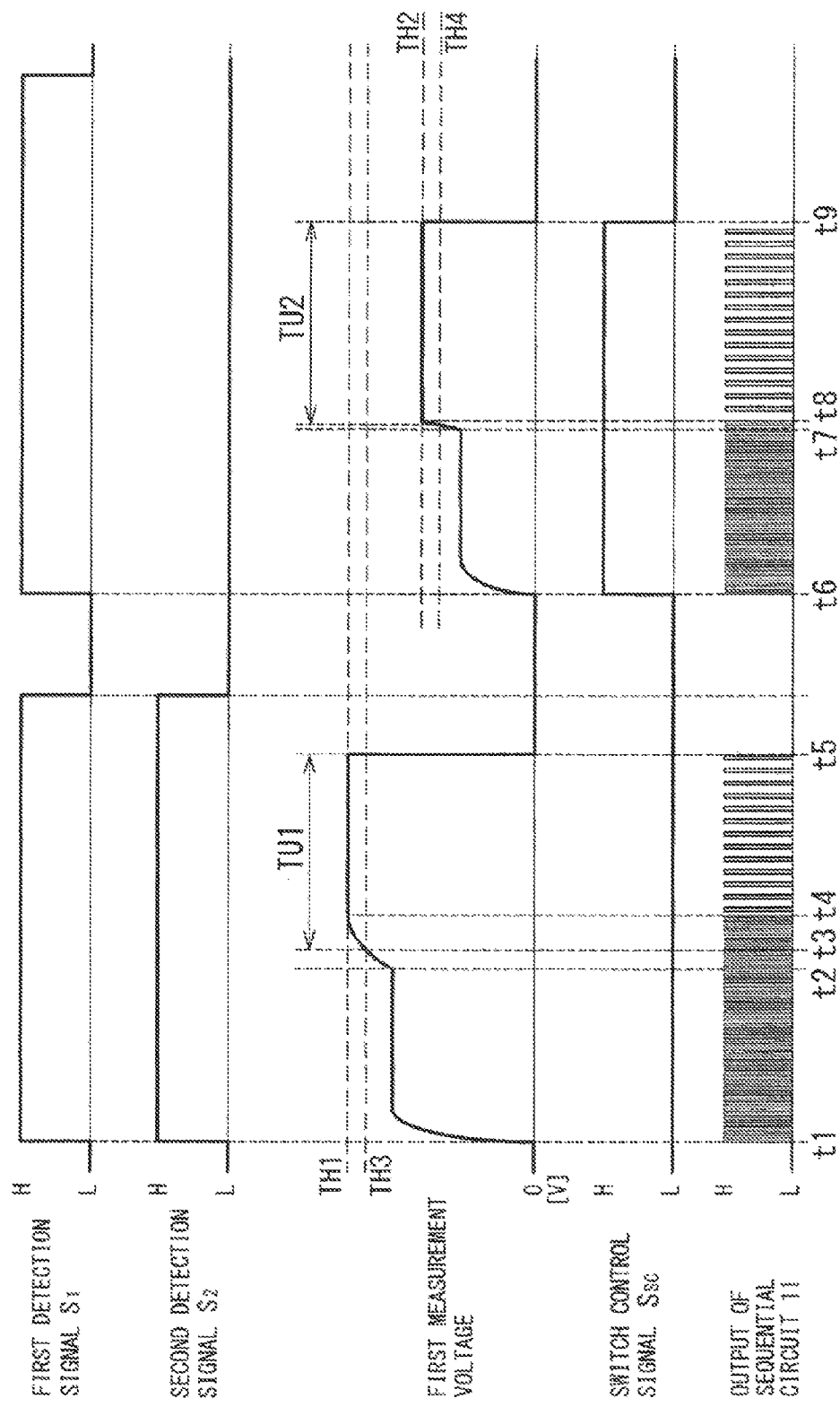
FIG. 3 is a time chart of an operation of the lighting device.

When at least one of the first and second light sources 21 and 22 has an open circuit failure (t=t2), the output voltage of the power converter 3 starts increasing due to the constant current control performed by the processor 4 (see FIG. 3). When the output voltage of the power converter 3 increases up to a voltage at which the first measurement voltage equals to the excess-voltage threshold (i.e., the first threshold voltage TH1) (t=t4), the interrupter 18 stops the operation of the power converter 3. Then the output of the interrupter 18 is repeatedly switched between the high-level and the low-level as described above when the cause (open circuit failure in the second light source 22, for example) of the increase in the output voltage is not resolved. The output voltage of the power converter 3 is thus kept around an excess voltage at which the first measurement voltage equals to the excess-voltage threshold (the first threshold voltage TH1) (see FIG. 3).

The processor 4 normally compares the average of the first measurement voltage with the high-voltage threshold (the third threshold voltage TH3) (S4 in FIG. 2). In a period in which the first measurement voltage is less than the high-voltage threshold (the third threshold voltage TH3), the processor 4 resets (clear) the measured duration time (S5 in FIG. 2). When the average of the first measurement voltage increases up to the high-voltage threshold (the third threshold voltage TH3) due to an increase in the output voltage of the power converter 3 (t=t3), the processor 4 starts counting (measuring) the duration time (S6 in FIG. 2). The processor 4 compares the duration time with an upper limit time TU1 (TU1=150 ms, for example) while counting the duration time (S7 in FIG. 2). When the duration time is less than the upper limit time TU1, the processor 4 returns to the step S4 and compares the average of the first measurement voltage with the high-voltage threshold (the third threshold voltage TH3). When the duration time reaches the upper limit time TU1 (t=t5), the processor 4 performs the process for terminating the operation of the power converter 3 (S8 in FIG. 2).

While the second detection signal S₂ is not supplied to the processor 4 (while the second instruction signal $S_{f2}$ is supplied) (t=t6), the threshold output section 45 sets the second threshold voltage TH2 as the excess-voltage threshold and sets the fourth threshold voltage TH4 as the high-voltage threshold (S3 in FIG. 2). If no fault occurs in the light source 2 and the lighting device 1, the output voltage of the power converter 3 is kept at a voltage (a second rated voltage) which is equal to the rated voltage of the first light source 21 but smaller than the fourth threshold voltage TH4 (see FIG. 3).

When the first light source 21 has an open circuit failure (t=t7), the output voltage of the power converter 3 starts increasing due to the constant current control performed by the processor 4 (see FIG. 3). When the output voltage of the power converter 3 increases up to a voltage at which the first measurement voltage equals to the excess-voltage threshold (i.e., the second threshold voltage TH2) (t=t8), the interrupter 18 stops the operation of the power converter 3. The output voltage of the power converter 3 is thus kept around an excess voltage at which the first measurement voltage equals to the excess-voltage threshold (the second threshold voltage TH2) (see FIG. 3).

The processor 4 normally compares the average of the first measurement voltage with the high-voltage threshold (the fourth threshold voltage TH4) (S4 in FIG. 2). In a period in which the first measurement voltage is less than the high-voltage threshold (the fourth threshold voltage TH4), the processor 4 resets (clear) the measured duration time (S5 in FIG. 2). When the average of the first measurement voltage increases up to the high-voltage threshold (the fourth threshold voltage TH4) due to an increase in the output voltage of the power converter 3 (t=t3), the processor 4 starts counting (measuring) the duration time (S6 in FIG. 2). The processor 4 compares the duration time with an upper limit time TU2 (TU2=150 ms, for example) while counting the duration time (S7 in FIG. 2). If the duration time is less than the upper limit TU2, the processor 4 returns to the step S4 to compares the average of the first measurement voltage with the high-voltage threshold (the fourth threshold voltage TH4). When the duration time reaches the upper limit time TU2 (t=t9), the processor 4 performs the process for terminating the operation of the power converter 3 (S8 in FIG. 2).

Figure 4:
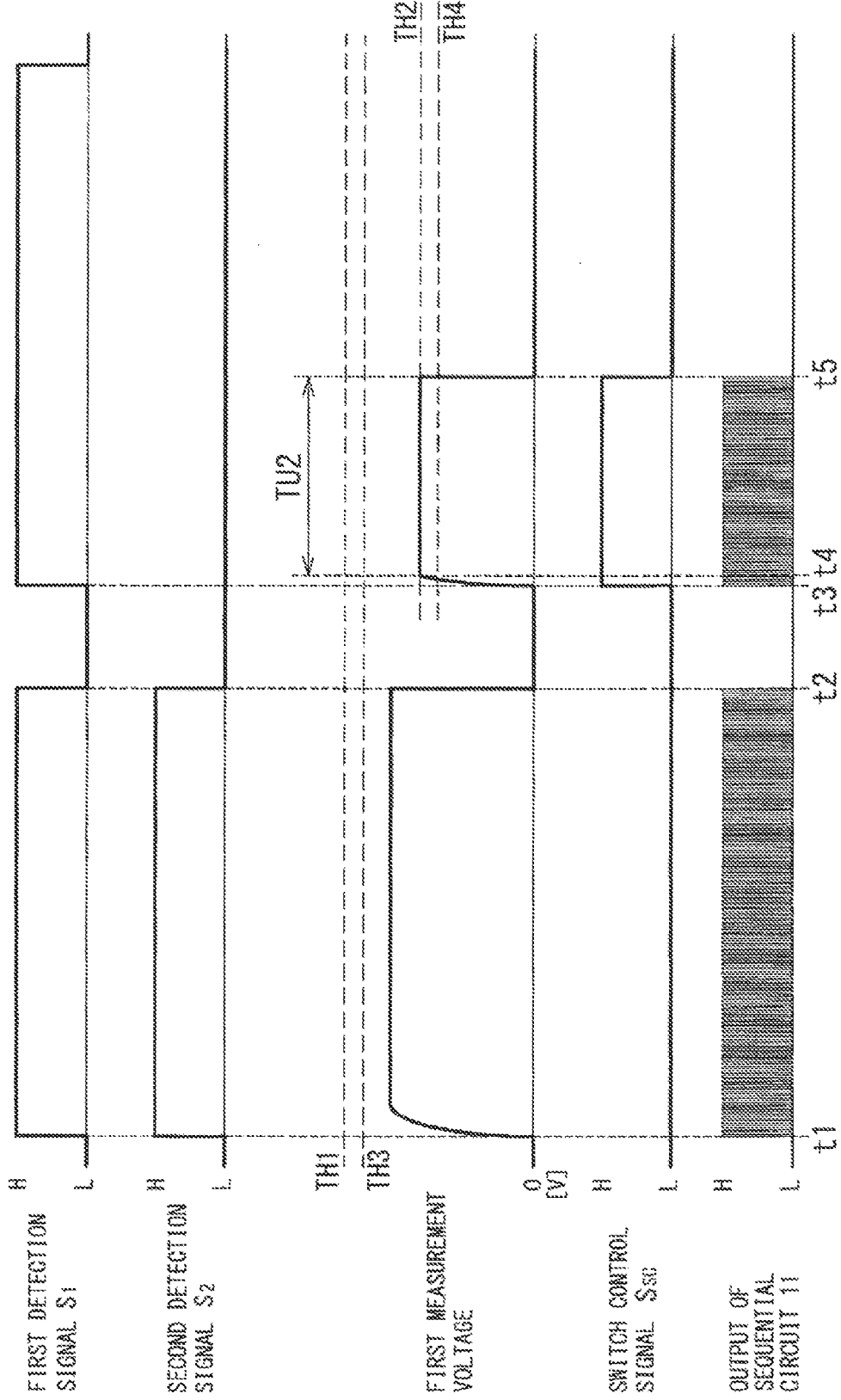
FIG. 4 is a time chart of an operation of the lighting device.

With reference to the time chart of FIG. 4, an operation of the lighting device 1 in a case where the bypass switch Q2 comes to have the open circuit failure (the bypass switch Q2 is latched at the OFF-state due to failure). While the second switch SW2 is on, the lighting device 1 would normally operate (t=t1~t2) regardless of the open circuit failure of the bypass switch Q2. While the second switch SW2 is off, the bypass switch Q2 having the open circuit failure cannot be switched from the open state to the short-circuited state even when receiving the drive signal SD. In this case, the threshold output section 45 sets the second threshold voltage TH2 as the excess-voltage threshold, and sets the fourth threshold voltage TH4 as the high-voltage threshold, because the second detection signal S2 is not supplied.

In this case, immediately after the process 4 starts the constant current control (t=t3), the first measurement voltage increases and exceeds the excess-voltage threshold (the second threshold voltage TH2) (t=t4). The output voltage of the power converter 3 is thus maintained around a voltage at which the first measurement voltage equals to the excess-voltage threshold (the second threshold voltage TH2). When a time (duration time) during which the first measurement voltage is maintained around the excess-voltage threshold (the second threshold voltage TH2) reaches the upper limit time TU2, the processor 4 performs the process for terminating the operation of the power converter 3 (t=t5). A driver of the vehicle therefore can recognize occurrence of the failure of the lighting device 1 and the light source 2, because the light source 2 does not emit light even when the first switch SW1 is turned on. In this case, by turning on both the first and second switches SW1 and SW2, the first and second light sources 21 and 22 can be lit by the lighting device 1. The driver therefore can drive the vehicle to a desired safe place (one's home or automobile repair shop) at night even when the lighting device 1 or the light source 2 are failed.

As described above, the lighting device 1 of the present embodiment is configured to change the excess-voltage threshold between the first threshold voltage TH1 and the second threshold voltage TH2 according to whether the current situation is a situation where both the first and second light sources 21 and 22 are to be lit or another situation where only the first light source 21 is to be lit (the second threshold voltage TH2<the first threshold voltage TH1). It is accordingly possible to suppress the magnitude of the rush current that possibly flows into the light source 2 in a recovering time to a correctly connected state, in comparison with a configuration in which the excess-voltage threshold is fixed to the first threshold voltage TH1. The lighting device 1 of the present embodiment uses the second threshold voltage TH2 lower than the first threshold voltage TH1 as the excess-voltage threshold, in a case where only the first light source 21 is allowed to be lit. It is accordingly possible to detect an abnormal output voltage of the power converter 3 more reliably. Consequently, the lighting device 1 of the present embodiment can suppress an occurrence of a failure that possibly damages the light source 2, and can detect an occurrence of an abnormal output voltage of the power converter 3 more reliably. It should be noted that the upper limit time TU1 and TU2, to be compared with the duration time, may be the same or different from each other.

As described above, the lighting device 1 of the present embodiment includes the power converter 3, the bypass switch Q2, the controller 6 (the processor 4, the comparator 10, the sequential circuit 11, the differentiation circuit 12, the interrupter 18 and the driver 19). The controller 6 includes the voltage meter 13. The lighting device 1 is configured to supply DC voltage and DC current generated by the power converter 3 to the light source 2 to light (operate) the light source 2. The light source 2 includes the first light source 21 and the second light source 22. The first light source 21 and the second light source 22 are to be electrically connected in series between the output ends 33 and 34 of the power converter 3 (between the first output terminal Y1 and the second output terminal Y2). The bypass switch Q2 is to be electrically connected in parallel to the second light source 22. The bypass switch Q2 is configured to be switched between the short-circuited state for bypassing the second light source 22 to prevent an output current of the power converter 3 to flow through the second light source 22, and the open state for allowing the output current to flow through the second light source 22. The power converter 3 includes the DC-DC converter that has at least one switching element (the first switching element) Q1. The controller 6 is configured to switch the bypass switch Q2 between the short-circuited state and the open state. The controller 6 is configured to control the switching element Q1 to adjust the output current of the power converter 3. The voltage meter 13 is configured to measure an output voltage of the power converter 3 or a divided voltage obtained by dividing the output voltage of the power converter 3. The controller 6 is configured to, while keeping the bypass switch in the open state, stop the operation of the power converter 3 by controlling the switching element Q1 when determining that a measured voltage of the voltage meter 13 (the first measurement voltage) is equal to or greater than the predetermined first threshold voltage TH1. The controller 6 is configured to, while keeping the bypass switch in the short-circuited state, stop the operation of the power converter 3 by controlling the switching element Q1 when determining that the measured voltage of the voltage meter 13 is equal to or greater than the predetermined second threshold voltage TH2. The second threshold voltage TH2 is set to be larger than the second rated voltage that corresponds to a rated value of the output voltage of the power converter 3 under a condition where the bypass switch Q2 is kept in the short-circuited state but smaller than the first rated voltage that corresponds to a rated value of the output voltage of the power converter 3 under a condition where the bypass switch Q2 is kept in the open state. The first threshold voltage TH1 is set to be larger than the first rated voltage.

The lighting device of the present embodiment has the above described configuration and thus is configured to change the threshold voltage of the output voltage of the power converter 3 depending on the state of the bypass switch Q2. It is accordingly possible to detect an occurrence of abnormal output voltage of the power converter 3 more reliably while avoiding an occurrence of a failure.

In the lighting device 1 of the present embodiment, the controller 6 is configured as follows. The controller 6 is configured to stop the operation of the power converter 3 by controlling the switching element when determining that a state where the measured voltage of the voltage meter 13 is equal to or greater than the predetermined third threshold voltage TH3 or the predetermined fourth threshold voltage TH4 continues for the predetermined first upper limit time TU1 or the predetermined second upper limit time TU2. While keeping the bypass switch Q2 in the open state, the controller 6 selects the third threshold voltage TH3 and the first upper limit time TU1. While keeping the bypass switch Q2 in the short-circuited state, the controller 6 selects the fourth threshold voltage TH4 and the second upper limit time TU2. The third threshold voltage TH3 is set to be larger than the first rated voltage but smaller than the first threshold voltage TH1. The fourth threshold voltage TH4 is set to be larger than the second rated voltage but smaller than the second threshold voltage TH2.

The lighting device 1 of the present embodiment has the above described configuration, and accordingly it is possible to avoid long time application of the excess voltage on the light source 2 and the bypass switch Q2.

Embodiment 2

A lighting device 1 according to Embodiment 2 has the same circuit structure as the lighting device according to Embodiment 1 as shown in FIG. 1. Therefore, detailed explanation and illustration of the circuit structure of the lighting device 1 of the present embodiment are omitted for sake of brevity.

The lighting device 1 of the present embodiment is characterized by changing the excess-voltage threshold and the high-voltage threshold after an elapse of a predetermined wait time period from a time when a bypass switch Q2 is turned on.

Figure 5:
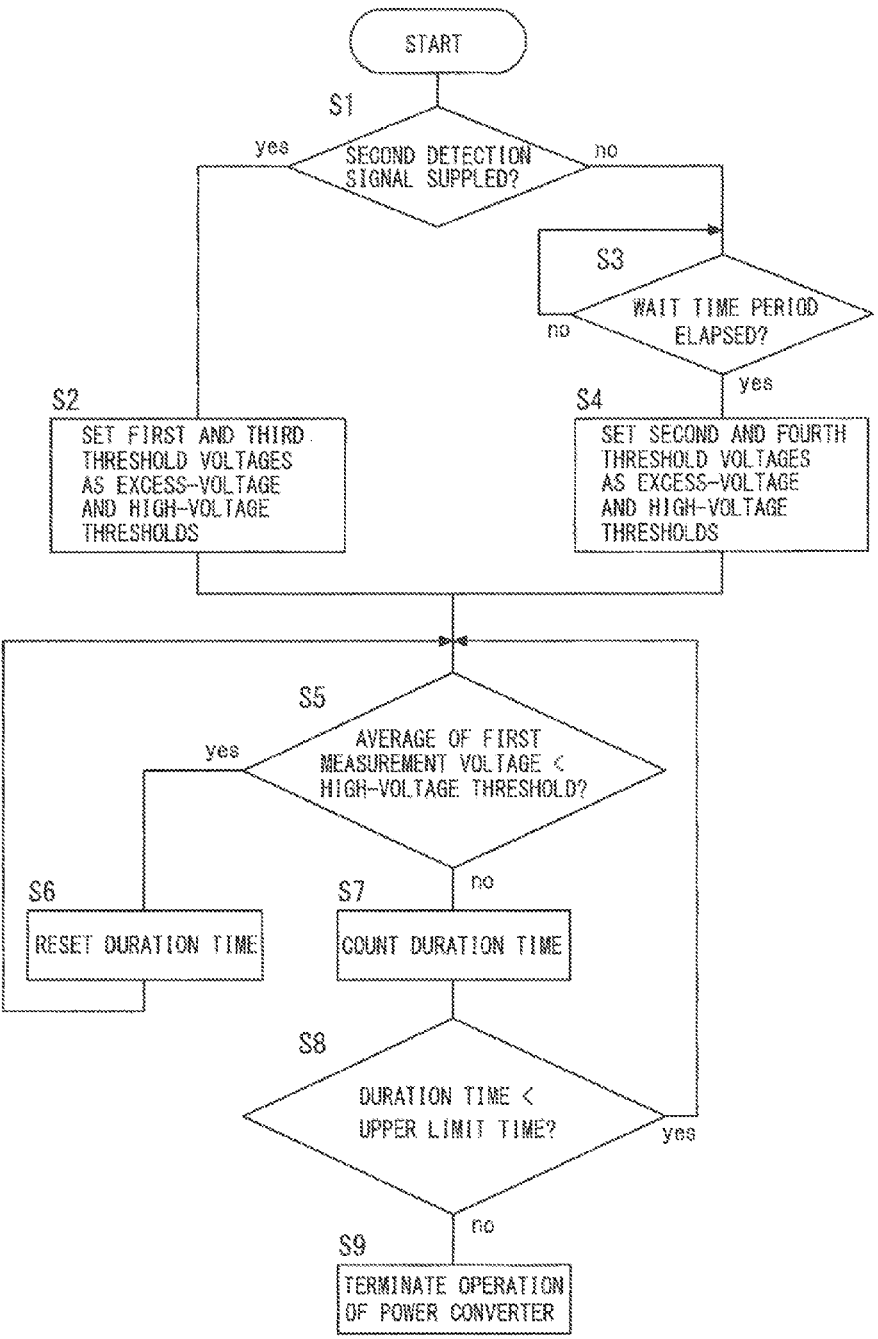
FIG. 5 is a flow chart of an operation of a lighting device according to Embodiment 2.

With reference to the flow chart of FIG. 5 and the time charts of FIGS. 6 and 7, operations of the lighting device 1 of the present embodiment will be explained. FIG. 5 shows the flow chart illustrating the operation (processing) of a processor 4.

When a first switch SW1 is turned on (t=t1 in FIGS. 6 and 7), the processor 4 starts performing a constant current control for keeping an output current of a power converter 3 equal to a target value (corresponding to a rated current of a light source 2) based on the above-described manner.

Figure 6:
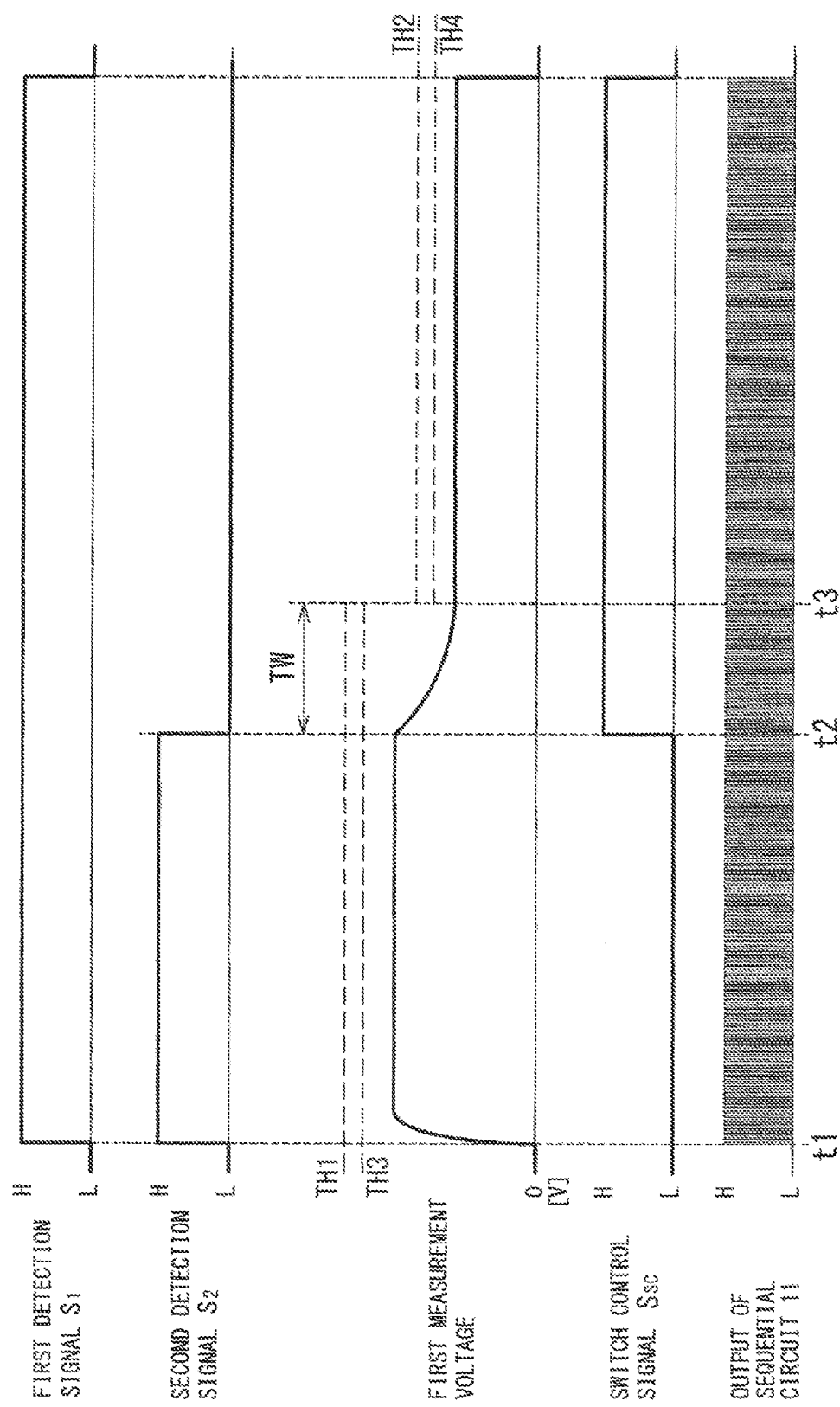
FIG. 6 is a time chart of an operation of the lighting device.

With reference to FIG. 6, while a second detection signal $S_2$ is supplied to the processor 4 (while a first instruction signal $S_{f1}$ is supplied), a threshold output section 45 sets a first threshold voltage TH1 as the excess-voltage threshold and sets a third threshold voltage TH3 as the high-voltage threshold. If no fault occurs in the light source 2 and the lighting device 1, an output voltage of the power converter 3 is kept at a first rated voltage.

When a second switch SW2 is turned off, the second power supply detector 16 stops outputting the second detection signal S2, and as a result a switch control section 44 outputs a switch control signal $S_{SC}$. The driver 19 starts outputting a drive signal $S_D$ to turn on the bypass switch Q2 when the switch control signal $S_{SC}$ is supplied (t=t2 in FIG. 6).

The processor 4 waits an elapse of the predetermined wait time period TW (S3 in FIG. 5) from a time when supply of the second detection signal S2 is stopped (t=t2 in FIG. 6). Upon the elapse of the wait time period TW being detected (t=t3 in FIG. 6), the threshold output section 45 of the processor 4 sets second and fourth threshold voltages TH2 and TH4 as the excess-voltage threshold and the high-voltage threshold, respectively (S4 in FIG. 5).

Figure 7:
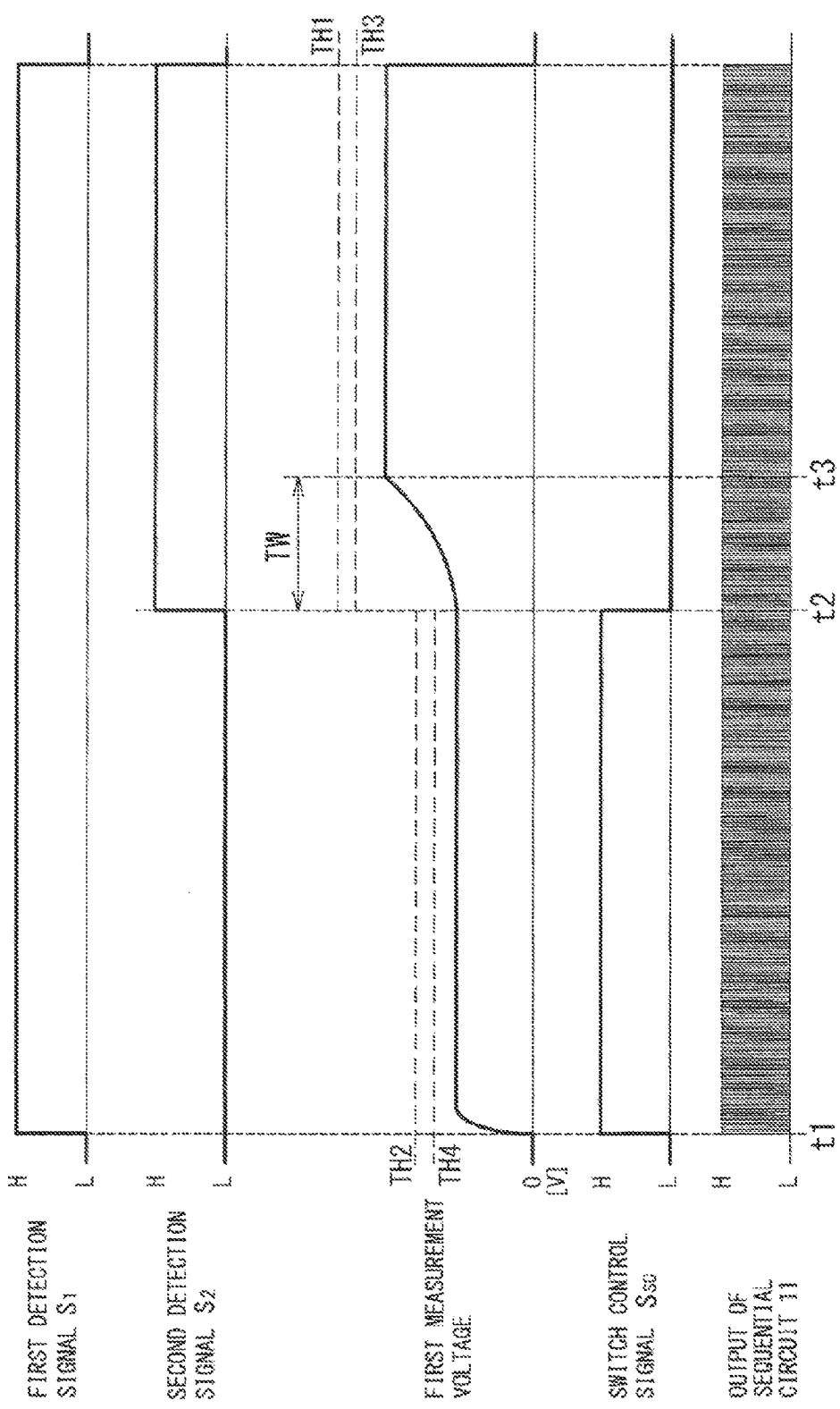
FIG. 7 is a time chart of an operation of the lighting device.

With reference FIG. 7, while the second detection signal $S_2$ is not supplied to the processor 4 (while a second instruction signal $S_{I2}$ is supplied), the threshold output section 45 sets the second threshold voltage TH2 as the excess-voltage threshold and sets the fourth threshold voltage TH4 as the high-voltage threshold. If no fault occurs in the light source 2 and the lighting device 1, the output voltage of the power converter 3 is kept at a second rated voltage.

When the second switch SW2 is turned on, the second power supply detector 16 starts outputting the second detection signal S2 to the processor 4, and as a result the switch control section 44 stops outputting the switch control signal $S_{SC}$. The driver 19 stops outputting the drive signal $S_D$ to turn off the bypass switch Q2 when supply of the switch control signal $S_{SC}$ is stopped (t=t2 in FIG. 7). Upon receiving the second detection signal $S_2$, the threshold output section 45 of the processor 4 sets the first and third threshold voltages TH1 and TH3 as the excess-voltage threshold and the high-voltage threshold, respectively (S2 in FIG. 5) without waiting the elapse of the wait time period TW. Note that steps S5 to S9 in FIG. 5 are the same as the steps S4 to S8 in FIG. 2, and thus explanation thereof are omitted.

As shown in a period from t2 to t3 in FIG. 6 and a period from t2 to t3 in FIG. 7, the output voltage of the power converter 3 (specifically, a first measurement voltage) measured with a voltage meter 13 varies gradually due to the delay in outputting the driver signal $S_D$ by the driver 19, transition time of the bypass switch, and the like. Therefore, in a configuration in which the threshold output section 45 changes the excess-voltage threshold and the high-voltage threshold in synchronization with a change in the second detection signal $S_2$ in a similar manner to Embodiment 1, the first measurement voltage may temporarily excess the excess-voltage threshold and the lighting device 1 may temporality turn off the light source 2.

In the lighting device 1 of the present embodiment, the threshold output section 45 does not change the excess-voltage threshold from the first threshold voltage TH1 to the second threshold voltage TH2 until the wait time period TW elapses after the processor 4 turns off the bypass switch Q2 in response to the second detection signal $S_2$. Therefore, the interrupter 18 does not stop the operation of the power converter 3 during a period in which the output voltage of the power converter 3 gradually decrease (see FIG. 6). Therefore, undesired temporal turning off of the light source 2 can be avoided.

In a case where the processor 4 turns off the bypass switch Q2 in response to the second detection signal S2, the threshold output section 45 changes the excess-voltage threshold from the second threshold voltage TH2 to the first threshold voltage TH1 without waiting the elapse of the wait time period TW. Therefore, the interrupter 18 does not stop the operation of the power converter 3 during a period in which the output voltage of the power converter 3 gradually increases (see FIG. 7). Therefore, undesired temporal turning off of the light source 2 can be avoided.

The wait time period TW is set to be comparable to a time period required for the output voltage of the power converter 3 to change from a second rated voltage to a first rated voltage. The wait time period TW is set to around 30 ms, preferably.

As described above, in the lighting device 1 of the present embodiment, the controller 6 is configured to, during the wait time period TW, stop the operation of the power converter 3 by controlling the switching element Q1 when determining that the measured voltage of the voltage meter 13 (the first measurement voltage) is equal to or greater than the first threshold voltage TH1. The wait time period TW is defined as a predetermined period of time after the bypass switch Q2 is switched from the open state to the short-circuited state or from the short-circuited state to the open state.

The lighting device 1 of the present embodiment has the above described configuration, and accordingly it is possible to reduce the possibility of undesired temporal turning off of the light source 2 during a period in which the output voltage of the power converter 3 changes.

Embodiment 3

A lighting device 1 according to Embodiment 3 has the same circuit structure as the lighting device according to Embodiment 1 as shown in FIG. 1. Therefore, detailed explanation and illustration of the circuit structure of the lighting device 1 of the present embodiment are again omitted.

The lighting device 1 of the present embodiment is characterized in configurations of a driver 19 and a switch control section 44. The driver 19 of the present embodiment includes a low-pass filter such as a CR integration circuit for example, and is configured to allow a drive signal $S_D$ to pass through the low-pass filter to drive (turn on and off) a bypass switch Q2 by the filtered drive signal $S_D$.

The switch control section 44 of the present embodiment is configured to output a switch control signal $S_{SC}$ having a form of a pulse width modulation signal. The switch control section 44 is configured to, upon detecting a falling edge of a second detection signal $S_2$ of a second power supply detector 16, gradually increase a duty cycle of the switch control signal $S_{SC}$ from 0% to 100%. Also, the switch control section 44 is configured to, upon detecting a rising edge of the second detection signal S2 of the second power supply detector 16, gradually decrease the duty cycle of the switch control signal $S_{SC}$ from 100% to 0%.

While the duty cycle of the switch control signal $S_{SC}$ increases from 0% to 100%, the drive signal $S_D$ of the driver 19 increases gradually from 0 [V] to a predefined voltage (corresponding to a gate voltage of the bypass switch Q2 at which the bypass switch Q2 is completely turned on). The ON-resistance of the bypass switch Q2 decreases along with the increase of the gate voltage, and thus a current flowing through a second light source 22 gradually decrease from a rated current to zero.

While the duty cycle of the switch control signal $S_{SC}$ decreases from 100% to 0%, the drive signal $S_D$ of the driver 19 decreases gradually from the predefined voltage to 0 [V]. The ON-resistance of the bypass switch Q2 increases along with the decrease of the gate voltage, and thus the current flowing through the second light source 22 gradually increase from zero to the rated current.

In short, the lighting device of the present embodiment is configured to gradually change the current flowing through the second light source 22 in a process of switching the bypass switch Q2 between an ON-state and an OFF-state, by use of amplification action of a MOSFET constituting the bypass switch Q2. With this configuration, the lighting device 1 of the present embodiment can reduce a stress on the second light source 22 and suppress flickering of a light source 2 which would otherwise occur during a process of switching the bypass switch Q2 between the ON-state and the OFF-state.

Figure 8:
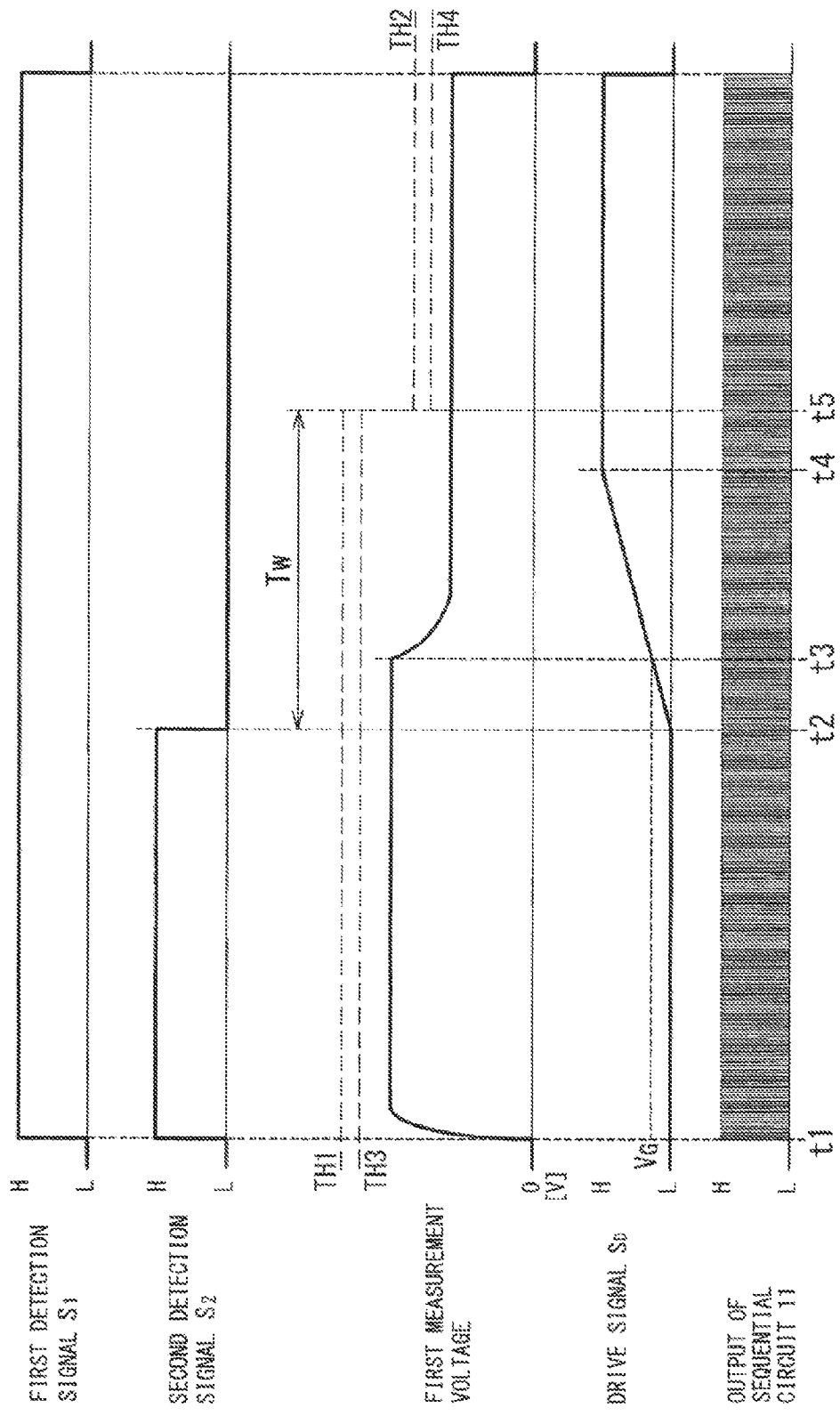
FIG. 8 is a time chart of an operation of a lighting device according to Embodiment 3.
Figure 9:
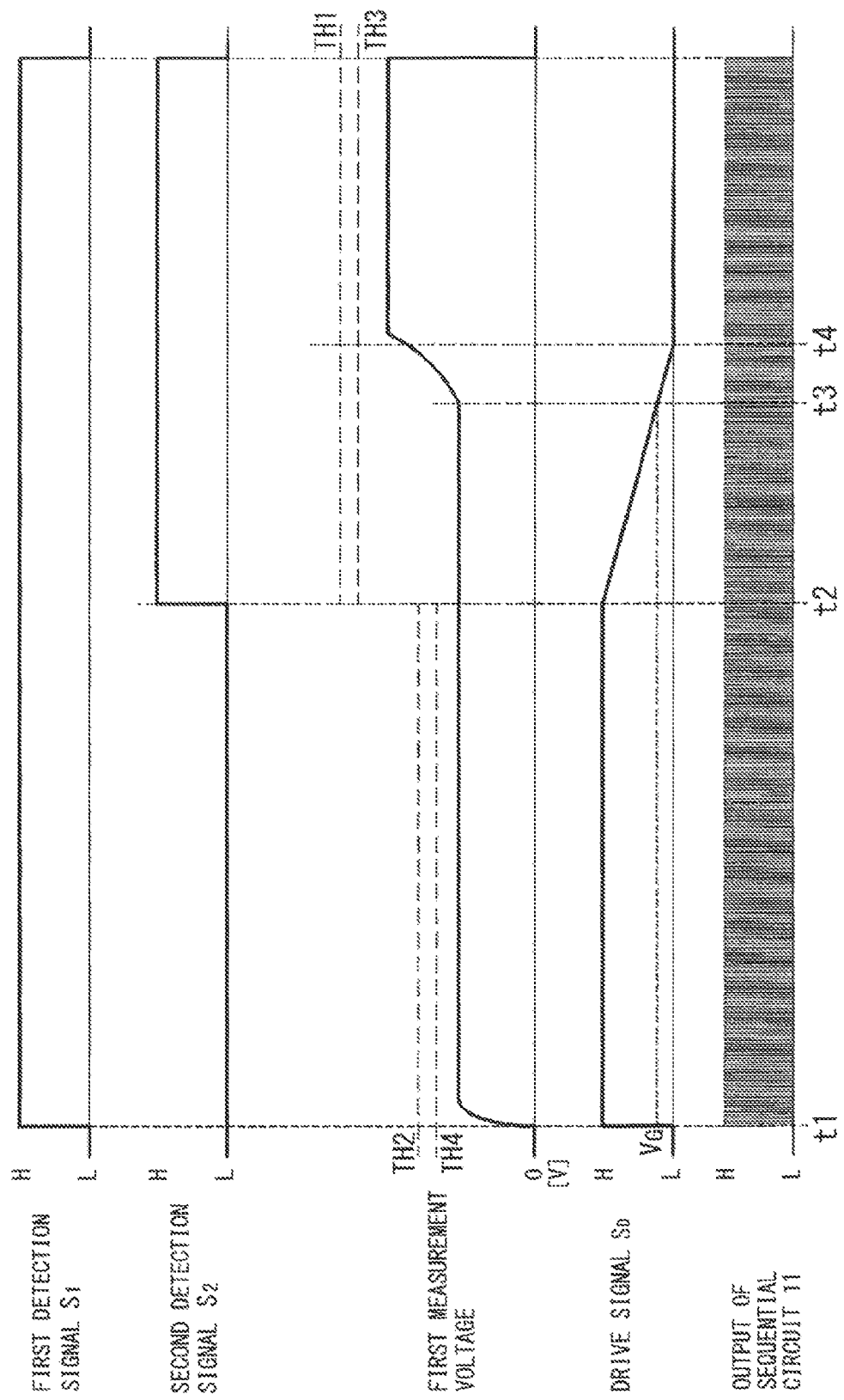
FIG. 9 is a time chart of an operation of the lighting device.

With reference to the time charts of FIGS. 8 and 9, operations of the lighting device 1 of the present embodiment will be explained. FIG. 8 shows a case in which the lighting device 1 changes from a main-beam state (a state where a second switch SW2 is turned on) to a low-beam state (a state where the second switch SW2 is turned off). FIG. 9 shows a case in which the lighting device 1 changes from the low-beam state (the state where the second switch SW2 is turned off) to the main-beam state (the state where the second switch SW2 is turned on).

An operation of the lighting device 1 switching from the main-beam state to the low-beam state is explained initially with reference to FIG. 8.

When a first switch SW1 is turned on (t=t1), a processor 4 starts performing a constant current control for keeping an output current of a power converter 3 equal to a target value (corresponding to a rated current of the light source 2) based on the above-described manner.

While the second detection signal $S_2$ is supplied to the processor 4 (while a first instruction signal $S_{I1}$ is supplied), a threshold output section 45 sets a first threshold voltage TH1 as an excess-voltage threshold and sets a third threshold voltage TH3 as a high-voltage threshold. If no fault occurs in the light source 2 and the lighting device 1, an output voltage of the power converter 3 is kept at a first rated voltage.

When the second switch SW2 is turned off, the second detection signal $S_2$ of the second power supply detector 16 falls to a low-level (t=t2). In response to a falling edge of the second detection signal $S_2$, the switch control section 44 starts gradually increasing the duty cycle of the switch control signal $S_{SC}$. The driver 19 gradually increases a voltage level of the drive signal $S_D$ from 0 [V] to the predefined voltage according to the switch control signal $S_{SC}$ (t=t2 to t4). The ON-resistance of the bypass switch Q2 decreases with the increase of the voltage level of the drive signal $S_D$, and as a result the current flowing through the second light source 22 gradually decreases from the rated current to zero. Note that the output voltage of the power converter 3 decreases from time when the voltage level of the drive signal $S_D$ increases up to a gate threshold voltage $V_G$ of the bypass switch Q2 (t=t3).

The processor 4 waits an elapse of a predetermined wait time period TW from time (t=t2) when the second detection signal $S_2$ falls to a low-level. Upon determining the elapse of the wait time period TW, the threshold output section 45 of the processor 4 sets a second threshold voltage TH2 and a fourth threshold voltage TH4 as the excess-voltage threshold and the high-voltage threshold, respectively (t=t5). Preferably, the wait time period TW is set to be comparable to the sum of a time period required for the increase of the drive signal $S_D$ (t=t2 to t4) and a time required for the bypass switch Q2 to be completely turned on, and may be set to around 90 ms. Alternatively, the wait time period TW may be set to be comparable to the time period required for the increase of the drive signal SD.

An operation of the lighting device 1 switching from the low-beam state to the main-beam state is explained next with reference to FIG. 9.

When the first switch SW1 is turned on (t=t1), the processor 4 starts performing the constant current control for keeping the output current of the power converter 3 equal to the target value (corresponding to the rated current of the light source 2) based on the above-described manner.

While the second detection signal $S_2$ is not supplied to the processor 4 (while a second instruction signal $S_{I2}$ is supplied), the threshold output section 45 sets the second threshold voltage TH2 as the excess-voltage threshold and sets the fourth threshold voltage TH4 as the high-voltage threshold. If no fault occurs in the light source 2 and the lighting device 1, the output voltage of the power converter 3 is kept at a second rated voltage.

When the second switch SW2 is turned on, the second detection signal $S_2$ of the second power supply detector 16 rises to the high-level (t=t2). In response to a rising edge of the second detection signal $S_2$, the switch control section 44 starts gradually decreasing the duty cycle of the switch control signal $S_{SC}$. The driver 19 gradually decreases the voltage level of the drive signal $S_D$ from the predefined voltage to 0 [V] according to the switch control signal $S_{SC}$ (t=t2 to t4). The ON-resistance of the bypass switch Q2 increases with the decrease of the voltage level of the drive signal SD, and as a result the current flowing through the second light source 22 gradually increases from zero to the rated current. Note that the output voltage of the power converter 3 increases from time when the voltage level of the drive signal $S_D$ decreases and becomes less than the gate threshold voltage $V_G$ of the bypass switch Q2 (t=t3).

Upon detecting the falling edge of the second detection signal $S_2$, the threshold output section 45 of the processor 4 sets the first threshold voltage TH1 and the third threshold voltage TH3 as the excess-voltage threshold and the high-voltage threshold, respectively (t=t2).

As described above, in the lighting device 1 of the present embodiment, the bypass switch Q2 is constituted by a transistor (specifically, an N-channel enhancement-type MOSFET). The controller 6 is configured to gradually decrease a current flowing through the second light source 22 by means of the amplification action of the transistor in a process of switching the bypass switch Q2 from the short-circuited state to the open state. The controller 6 is configured to gradually increase the current flowing through the second light source 22 by means of the amplification action of the transistor in a process of switching the bypass switch Q2 from the open state to the short-circuited state.

The lighting device 1 of the present embodiment has the above described configuration, and accordingly it is possible to reduce a stress on the light source 2 and suppress flickering of the light source 2 which would otherwise occur during a process of switching the bypass switch Q2 between the ON-state and the OFF-state.

Embodiment 4

A lighting device 1 according to Embodiment 4 has the same circuit structure as the lighting device according to Embodiment 1 as shown in FIG. 1. Therefore, detailed explanation and illustration of the circuit structure of the lighting device 1 of the present embodiment are again omitted.

The lighting device 1 of the present embodiment is characterized by setting a fifth threshold voltage TH5 as an excess-voltage threshold in a process of switching the bypass switch Q5 between an ON-state and an OFF-state. Also, the lighting device 1 of the present embodiment is configured to set a sixth threshold voltage TH6 as a high-voltage threshold in the process of switching the bypass switch Q5 between the ON-state and the OFF-state. The fifth threshold voltage TH5 is smaller than the first threshold voltage TH1 but larger than the second threshold voltage TH2. The sixth threshold voltage TH6 is smaller than the third threshold voltage TH3 but larger than the fourth threshold voltage TH4.

Preferably, the processor 4 is configured to decrease the fifth threshold voltage TH5 of a threshold output section 45 at a constant rate (−0.2 [V/ms], for example) from the first threshold voltage TH1 to the second threshold voltage TH2 when detecting a falling edge of the second detection signal $S_2$. Also, preferably, the processor 4 is configured to decrease the sixth threshold voltage TH6 of the threshold output section 45 at a constant rate (−0.2 [V/ms], for example) from the third threshold voltage TH3 to the fourth threshold voltage TH4 when detecting a falling edge of the second detection signal $S_2$.

Preferably, the processor 4 is configured to increase the fifth threshold voltage TH5 of the threshold output section 45 at a constant rate (2 [V/ms], for example) from the second threshold voltage TH2 to the first threshold voltage TH1 when detecting a rising edge of the second detection signal $S_2$. Also, preferably, the processor 4 is configured to increase the sixth threshold voltage TH6 of the threshold output section 45 at a constant rate (2 [V/ms], for example) from the fourth threshold voltage TH4 to the third threshold voltage TH3 when detecting a rising edge of the second detection signal $S_2$.

That is, the lighting device 1 of the present embodiment uses, during a predetermined time period after switching the bypass switch Q2 between the ON-state and the OFF-state, a variable fifth threshold voltage TH5 that varies with an increase in elapsed time, as the excess-voltage threshold. The processor 4 is configured to linearly change the fifth threshold voltage TH5 between the first threshold voltage TH1 and the second threshold voltage TH2 with an increase in elapsed time after switching the bypass switch Q2 between the ON-state and the OFF-state. Specifically, the processor 4 is configured to decrease the excess-voltage threshold from the first threshold voltage TH1 to the second threshold voltage TH2 at a constant rate after switching the bypass switch Q2 from the OFF-state to the ON-state. Also, the processor 4 is configured to increase the excess-voltage threshold from the second threshold voltage TH2 to the first threshold voltage TH1 at a constant rate after switching the bypass switch Q2 from the ON-state to the OFF-state.

Also, the lighting device 1 of the present embodiment uses, during a predetermined time period from time when after switching the bypass switch Q2 between the ON-state and the OFF-state, a variable sixth threshold voltage TH6 that varies with an increase in elapsed time, as the high-voltage threshold. The processor 4 is configured to linearly change the sixth threshold voltage TH6 between the third threshold voltage TH3 and the fourth threshold voltage TH4 with an increase in elapsed time after switching the bypass switch Q2 between the ON-state and the OFF-state. Specifically, the processor 4 is configured to decrease the high-voltage threshold from the third threshold voltage TH3 to the fourth threshold voltage TH4 at a constant rate after switching the bypass switch Q2 from the ON-state to the OFF-state. Also, the processor 4 is configured to increase the high-voltage threshold from the fourth threshold voltage TH4 to the third threshold voltage TH3 at a constant rate after switching the bypass switch Q2 from the OFF-state to the ON-state.

Figure 10:
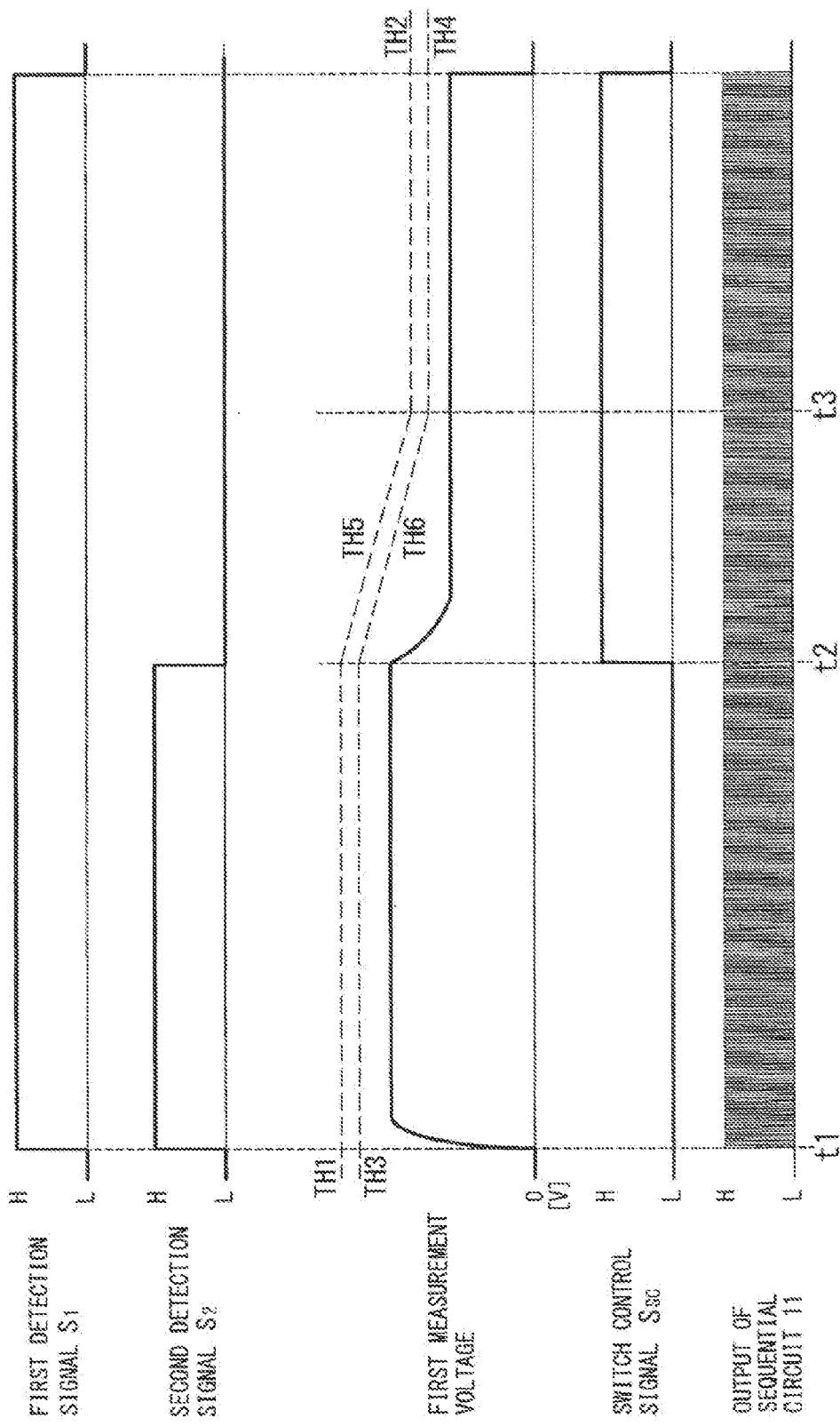
FIG. 10 is a time chart of an operation of a lighting device according to Embodiment 4.
Figure 11:
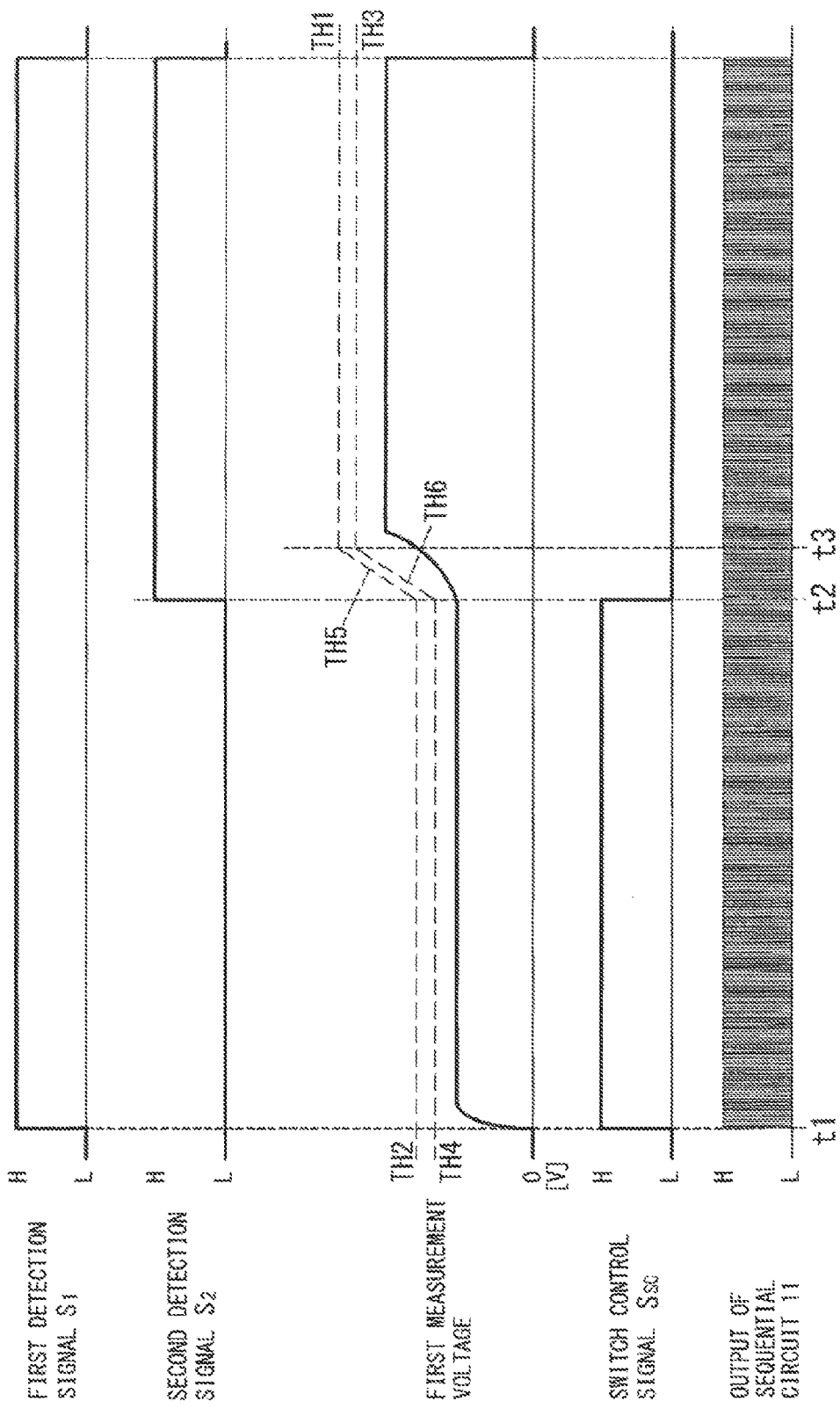
FIG. 11 is a time chart of an operation of the lighting device.

With reference to the time charts of FIGS. 10 and 11, operations of the lighting device 1 of the present embodiment will be explained. FIG. 10 shows a case in which the lighting device 1 switches from a main-beam state (a state where a second switch SW2 is on) to a low-beam state (a state where the second switch SW2 is off). FIG. 11 shows a case in which the lighting device 1 switches from the low-beam state (the state where the second switch SW2 is off) to the main-beam state (the state where the second switch SW2 is on).

An operation of the lighting device 1 switching from the main-beam state to the low-beam state is explained initially with reference to FIG. 10.

When a first switch SW1 is turned on (t=t1), the processor 4 starts performing a constant current control for keeping an output current of a power converter 3 equal to a target value (corresponding to a rated current of the light source 2) based on the above-described manner.

While the second detection signal $S_2$ is supplied to the processor 4 (while a first instruction signal $S_{I1}$ is supplied), a threshold output section 45 sets a first threshold voltage TH1 as the excess-voltage threshold and sets a third threshold voltage TH3 as the high-voltage threshold. If no fault occurs in the light source 2 and the lighting device 1, an output voltage of the power converter 3 is kept at a first rated voltage.

When the second switch SW2 is turned off, the second detection signal $S_2$ of the second power supply detector 16 falls to a low-level (t=t2). In response to a falling edge of the second detection signal $S_2$, the threshold output section 45 starts decreasing the excess-voltage threshold from the first threshold voltage TH1 to the second threshold voltage TH2 at the constant rate (−0.2 [V/ms], for example). In parallel, the threshold output section 45 starts decreasing the high-voltage threshold from the third threshold voltage TH3 to the fourth threshold voltage TH4 at the constant rate (−0.2 [V/ms], for example). The threshold output section 45 sets the second threshold voltage TH2 and the fourth threshold voltage TH4 as the excess-voltage threshold and the high-threshold voltage, respectively at the time t=t3.

An operation of the lighting device 1 switching from the low-beam state to the main-beam state is explained next with reference to FIG. 11.

When the first switch SW1 is turned on (t=t1), the processor 4 starts performing the constant current control for keeping the output current of the power converter 3 equal to the target value (corresponding to the rated current of the light source 2) based on the above-described manner.

While the second detection signal $S_2$ is not supplied to the processor 4 (while a second instruction signal $S_{I2}$ is supplied), the threshold output section 45 sets the second threshold voltage TH2 as the excess-voltage threshold and sets the fourth threshold voltage TH4 as the high-voltage threshold. If no fault occurs in the light source 2 and the lighting device 1, the output voltage of the power converter 3 is kept at a second rated voltage.

When the second switch SW2 is turned on, the second detection signal $S_2$ of the second power supply detector 16 rises to a high-level (t=t2). In response to a rising edge of the second detection signal $S_2$, the threshold output section 45 starts increasing the excess-voltage threshold from the second threshold voltage TH2 to the first threshold voltage TH1 at the constant rate (2 [V/ms], for example). In parallel, the threshold output section 45 starts increasing the high-voltage threshold from the fourth threshold voltage TH4 to the third threshold voltage TH3 at the constant rate (2 [V/ms], for example). The threshold output section 45 sets the first threshold voltage TH1 and the third threshold voltage TH3 as the excess-voltage threshold and the high-threshold voltage, respectively at the time t=t3.

As described above, the lighting device 1 of the present embodiment is configured to set, as the excess-voltage threshold, the fifth threshold voltage TH5 which is lower than the first threshold voltage TH1 but higher than the second threshold voltage TH2, in a process of switching the bypass switch Q2 between the ON-state and the OFF-state. Further, the lighting device 1 of the present embodiment is configured to set, as the high-voltage threshold, the sixth threshold voltage TH6 which is lower than the third threshold voltage TH3 but higher than the fourth threshold voltage TH4, in the process of switching the bypass switch Q2 between the ON-state and the OFF-state.

With this configuration, the lighting device 1 of the present embodiment can detect an occurrence of a failure such as an open circuit failure of the light source 2 during a period in which the lighting device 1 is switched between the main-beam state and the low-beam state, using the output voltage of the power lighting device 1 that changes temporarily.

As described above, in the lighting device 1 of the present embodiment, the controller 6 (the processor 4; the threshold output section 45) is configured to, in a process of switching the bypass switch Q2 between the short-circuited state and the open state, compare the measured voltage of the voltage meter 13 with the fifth threshold voltage TH5. The controller 6 is configured to stop the operation of the power converter 3 by controlling the switching element Q1 when determining that the measured voltage is equal to or greater than the fifth threshold voltage TH5. The fifth threshold voltage TH5 is set to be larger than the second threshold voltage TH2 but smaller than the first threshold voltage TH.

The lighting device 1 of the present embodiment has the above described configuration, and accordingly it is possible to detect an occurrence of a failure such as an open circuit failure of the light source 2 even in a period during which the output voltage of the power converter 3 varies.

Embodiment 5

Figure 12:
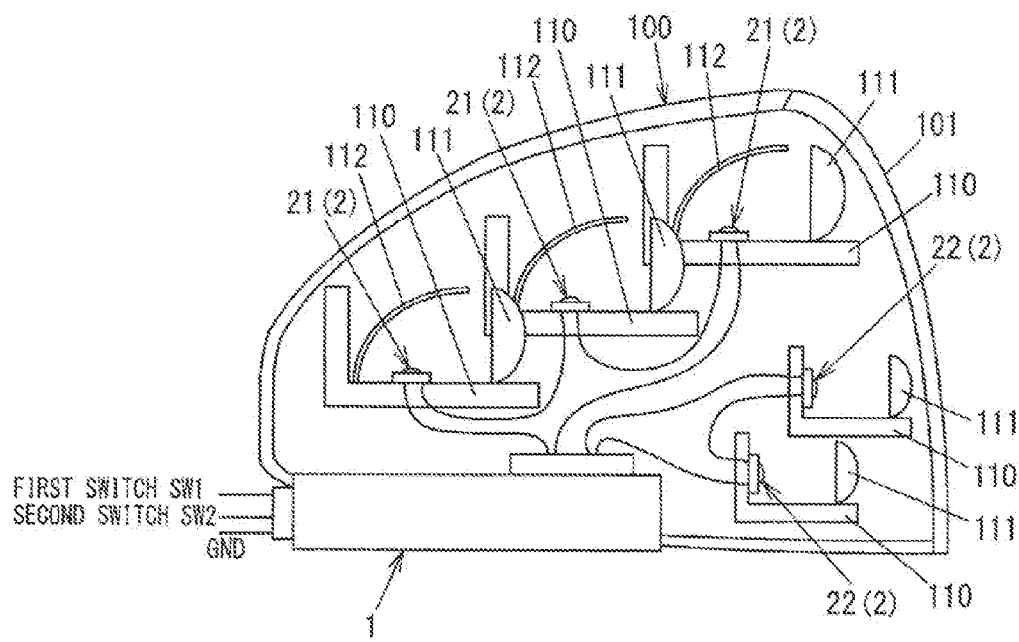
FIG. 12 is a schematic diagram of a headlight according to Embodiment 5.

A headlight 100 according to Embodiment 5 is explained. As shown in FIG. 12, the headlight 100 of the present embodiment includes a lighting device 1 according to any one of Embodiment 1 to 4, a light source 2 (a first light source 21 and a second light source 22), and a housing 101 in which the light source 2 is housed. Lamp holders 110 to which LEDs 20 of the first light source 21 and the second light source 22 are attached are provided in the housing 101. Each lamp holder 110 to which at least one LED 20 of the first light source 21 is attached is further provided with a lens 111 and a reflector 112. Each lamp holder 110 to which at least one LED 20 of the second light source 22 is attached is further provided with a lens 111.

As described above, the headlight 100 of the present embodiment includes the lighting device 1, the light source 2 to be lit (operated) by the electric power supplied from the lighting device 1, and the housing 101 that houses the light source 2.

The headlight 100 of the present embodiment has the above described configuration, and accordingly it is possible to detect an occurrence of abnormal output voltage of the power converter 3 while avoiding an occurrence of a failure.

Embodiment 6

Figure 13:
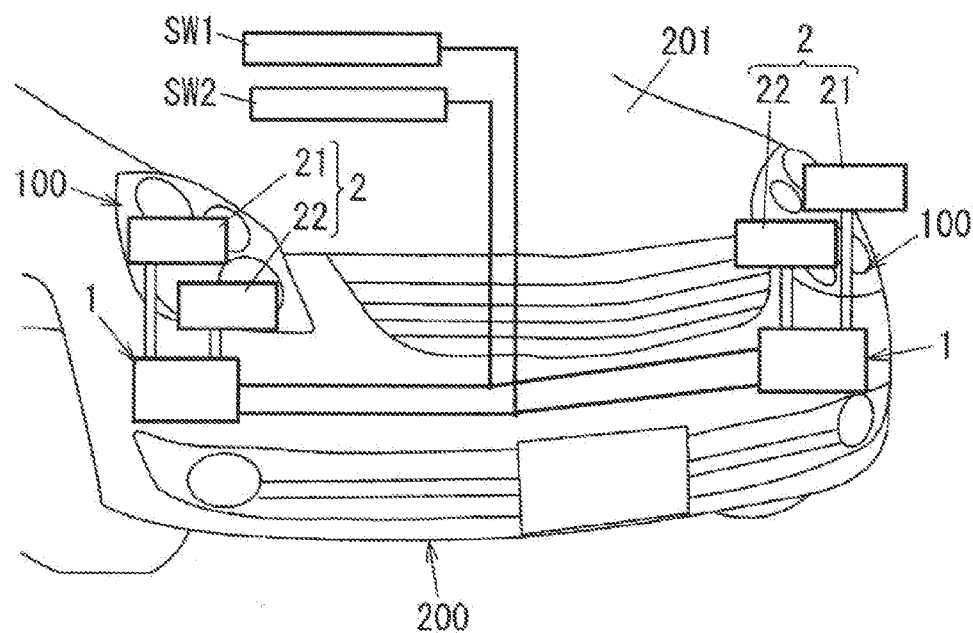
FIG. 13 is a schematic diagram of a vehicle according to Embodiment 6.

As shown in FIG. 13, a vehicle 200 according to Embodiment 6 includes a vehicle body 201, and two headlights 100 of Embodiment 5 equipped on the vehicle body 201. Lighting devices 1 of the headlights 100 are electrically connected to a first switch SW1 and a second switch SW2 which are situated around a driver's sheet in the vehicle. While only the first switch SW1 is on, a low-beam lamp (first light sources 21 of the headlights 100) is lit. While both the first and second switches SW1 and SW2 are on, a main beam lamp (first light sources 21 and second light sources 22 of the headlights 100) is lit.

As described above, the vehicle 200 of the present embodiment includes one or more headlights 100 and the vehicle body 201 in which the one or more headlights 100 is installed.

The headlight 100 of the present embodiment has the above described configuration, and accordingly it is possible to detect an occurrence of abnormal output voltage of the power converter 3 yet avoid an occurrence of a failure.

In accordance with the embodiments described above, a lighting device (1) according to a first aspect is for lighting a DC light source (2) including a first light source (21) and a second light source (22). The lighting device (1) includes first to third output terminals (Y1 to Y3), a power converter (3), a bypass switch (Q2), and a controller (6). The first output terminal (Y1) is to be electrically connected to a first end of the first light source (21). The third output terminal (Y3) is to be electrically connected to a second end of the first light source (21) and a first end of the second light source (22). The second output terminal (Y2) is to be electrically connected to a second end of the second light source (22). The power converter (3) includes a DC-DC converter and a pair of output ends (33, 34) electrically connected respectively to the first and second output terminals (Y1, Y2). The power converter (3) is configured to supply an output current from the DC-DC converter through the pair of output ends (33, 34). The bypass switch (Q2) is electrically connected between the second and third output terminals (Y2, Y3). The controller (6) is configured to switch the bypass switch (Q2) between an ON-state and an OFF-state, and to control the power converter (3) to adjust the output current of the power converter (3). The controller (6) includes a voltage meter (13) configured to measure a voltage corresponding to an output voltage of the power converter (3) to output a measured voltage. The controller (6) is configured to, while keeping the bypass switch (Q2) in the OFF-state, compare the measured voltage of the voltage meter (13) with a predetermined first threshold voltage (TH1), and stop operation of the power converter (3) when determining that the measured voltage is equal to or greater than the first threshold voltage (TH1). The controller (6) is configured to, while keeping the bypass switch (Q2) in the ON-state, compare the measured voltage of the voltage meter (13) with a predetermined second threshold voltage (TH2), and stop the operation of the power converter (3) when determining that the measured voltage is equal to or greater than the second threshold voltage (TH2). The second threshold voltage (TH2) is smaller than a first rated voltage but larger than a second rated voltage. The first rated voltage corresponds to a rated value of the output voltage of the power converter (3) under a condition where the bypass switch (Q2) is kept in the OFF-state. The second rated voltage corresponds to a rated value of the output voltage of the power converter (3) under a condition where the bypass switch (Q2) is kept in the ON-state. The first threshold voltage (TH1) is larger than the first rated voltage.

A lighting device (1) according to a second aspect is realized in combination with the first aspect, and the controller (3) is configured to stop the operation of the power converter (3) when determining that a state where the measured voltage of the voltage meter (13) is equal to or greater than a predetermined third threshold voltage (TH3) continues for a predetermined first upper limit time (TU1) while keeping the bypass switch (Q2) in the OFF-state. The third threshold voltage (TH3) is larger than the first rated voltage but smaller than the first threshold voltage (TH1).

A lighting device (1) according to a third aspect is realized in combination with the first or second aspect, and the controller (6) is configured to stop the operation of the power converter (3) when determining that a state where the measured voltage of the voltage meter (13) is equal to or greater than a predetermined fourth threshold voltage (TH4) continues for a predetermined second upper limit time (TU2) while keeping the bypass switch (Q2) in the ON-state. The fourth threshold voltage (TH4) is larger than the second rated voltage but smaller than the second threshold voltage (TH2).

A lighting device (1) according to a fourth aspect is realized in combination with any one of the first to third aspects, and the controller (6) is configured to, during a predetermined wait time period (TW) after switching the bypass switch (Q2) from the OFF-state to the ON-state or after switching the bypass switch (Q2) from the ON-state to the OFF-state, compare the measured voltage of the voltage meter (13) with the first threshold voltage (TH1), and stop the operation of the power converter (3) when determining that the measured voltage is equal to or greater than the first threshold voltage (TH1).

A lighting device (1) according to a fifth aspect is realized in combination with any one of the first to fourth aspects, and the bypass switch (Q2) includes a transistor. The controller (6) is configured to increase current flowing thorough the bypass switch (Q2) with an increase in elapsed time in a process of switching the bypass switch (Q2) from the ON-state to the OFF-state, and to decrease the current flowing thorough the bypass switch (Q2) with an increase in elapsed time in a process of switching the bypass switch (Q2) from the ON-state to the OFF-state, by means of an amplification action of the bypass switch (Q2).

A lighting device (1) according to a sixth aspect is realized in combination with the first aspect, and the controller (6) is configured to, during a predetermined time period after switching the bypass switch (Q2) between the ON-state and the OFF-state, compare the measured voltage of the voltage meter (13) with a fifth threshold voltage (TH5), and stop the operation of the power converter (3) when determining that the measured voltage is equal to or greater than the fifth threshold voltage (TH5). The fifth threshold voltage (TH5) is larger than the second threshold voltage (TH2) but smaller than the first threshold voltage (TH1).

A lighting device (1) according to a seventh aspect is realized in combination with any one of the sixth aspect, and the controller (6) is configured to linearly change the fifth threshold voltage (TH5) between the first threshold voltage (TH1) and the second threshold voltage (TH2) with an increase in elapsed time after switching the bypass switch (Q2) between the ON-state and the OFF-state.

A lighting device (1) according to an eighth aspect is realized in combination with any one of the first to seventh aspects, and the first rated voltage is defined by a sum of a rated voltage of the first light source (21) and a rated voltage of the second light source (22). The second rated voltage is defined by the rated voltage of the first light source (21).

A lighting device (1) according to a ninth aspect is realized in combination with any one of the first to seventh aspects, and the first light source (21) is constituted by a series circuit of LEDs and has a first forward voltage, and the second light source (22) is constituted by a series circuit of LEDs and has a second forward voltage. The first rated voltage is defined by a sum of the first forward voltage and the second forward voltage. The second rated voltage is defined by the first forward voltage.

A lighting device (1) according to a tenth aspect is realized in combination with the first aspect, and further includes a signal input terminal (X3) for receiving a first instruction signal (Su) and a second instruction signal ($S_{r2}$). The controller (6) is configured to, keep the bypass switch (Q2) in the OFF-state while the signal input terminal (X3) receives the first instruction signal (Su), and keep the bypass switch (Q2) in the ON-state while the signal input terminal (X3) receives the second instruction signal ($S_{r2}$).

A lighting device (1) according to an eleventh aspect is realized in combination with any one of the first to tenth aspects, and the DC-DC converter includes a switching element (Q1). The controller (6) further includes a current meter (14) configured to measure a current supplied from the power converter (3) to the DC light source (2), and to output a measured current. The controller (6) is configured to control a switching operation of the switching element (Q1) such that the measured current of the current meter (14) is equal to a predetermined target value. The controller (6) is configured to, while keeping the bypass switch (Q2) in the OFF-state, stop the operation of the power converter (3) by turning off the switching element (Q1) when determining that the measured voltage is equal to or greater than the first threshold voltage (TH1), and, while keeping the bypass switch (Q2) in the ON-state, stop the operation of the power converter (3) by turning off the switching element (Q1) when determining that the measured voltage is equal to or greater than the second threshold voltage (TH2).

A lighting device (1) according to a twelfth aspect is realized in combination with the eleventh aspect, and the power converter (3) further includes an inductor (T1) for storing therein energy in response to supply of electric power from an external DC power source (B1) while the switching element (Q1) is on, and a capacitor (C1) to be charged by a regeneration current from the inductor (T1) while the switching element (Q1) is off. The controller (6) is configured to generate a primary current instruction value based on the measured current of the current meter (14) and the target value. The controller (6) is configured to turn off the switching element (Q1) when a primary current flowing through the switching element (Q1) reaches the primary current instruction value, and turn on the switching element (Q1) when the regeneration current reaches zero or when a predetermined suspension time elapses from a time when the switching element (Q1) is turned on last time.

A headlight (100) according to a thirteenth aspect includes the lighting device (1) of any one of the first to twelfth aspects, a light source (2) to be lit by electric power supplied from the lighting device (1), and a housing (101) that houses the light source (2).

A vehicle (200) according to a fourteenth aspect includes the headlight (100) of thirteenth aspect, and a vehicle body (201) in which the headlight (100) is installed.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device for lighting a DC light source including a first light source and a second light source, the lighting device comprising:
a first output terminal to be electrically connected to a first end of the first light source;
a third output terminal to be electrically connected to a second end of the first light source and a first end of the second light source;
a second output terminal to be electrically connected to a second end of the second light source;
a power converter that includes a DC-DC converter and a pair of output ends electrically connected respectively to the first and second output terminals, and is configured to supply an output current from the DC-DC converter through the pair of output ends;
a bypass switch electrically connected between the second and third output terminals; and
a controller configured to switch the bypass switch between an ON-state and an OFF-state, and to control the power converter to adjust the output current of the power converter,
the controller including a voltage meter configured to measure a voltage corresponding to an output voltage of the power converter to output a measured voltage,
the controller being configured to
while keeping the bypass switch in the OFF-state, compare the measured voltage of the voltage meter with a predetermined first threshold voltage, and stop operation of the power converter when determining that the measured voltage is equal to or greater than the first threshold voltage, and
while keeping the bypass switch in the ON-state, compare the measured voltage of the voltage meter with a predetermined second threshold voltage, and stop the operation of the power converter when determining that the measured voltage is equal to or greater than the second threshold voltage,
the second threshold voltage being smaller than a first rated voltage but larger than a second rated voltage, the first rated voltage corresponding to a rated value of the output voltage of the power converter under a condition where the bypass switch is kept in the OFF-state, the second rated voltage corresponding to a rated value of the output voltage of the power converter under a condition where the bypass switch is kept in the ON-state, and
the first threshold voltage being larger than the first rated voltage.

2. The lighting device of claim 1, wherein:
the controller is configured to stop the operation of the power converter when determining that a state where the measured voltage of the voltage meter is equal to or greater than a predetermined third threshold voltage continues for a predetermined first upper limit time while keeping the bypass switch in the OFF-state; and
the third threshold voltage is larger than the first rated voltage but smaller than the first threshold voltage.

3. The lighting device of claim 1, wherein:
the controller is configured to stop the operation of the power converter when determining that a state where the measured voltage of the voltage meter is equal to or greater than a predetermined fourth threshold voltage continues for a predetermined second upper limit time while keeping the bypass switch in the ON-state; and
the fourth threshold voltage is larger than the second rated voltage but smaller than the second threshold voltage.

4. The lighting device of claim 1, wherein:
the controller is configured to, during a predetermined wait time period after switching the bypass switch from the OFF-state to the ON-state or after switching the bypass switch from the ON-state to the OFF-state, compare the measured voltage of the voltage meter with the first threshold voltage, and stop the operation of the power converter when determining that the measured voltage is equal to or greater than the first threshold voltage.

5. The lighting device of claim 1, wherein:
the bypass switch includes a transistor; and
the controller is configured to increase current flowing thorough the bypass switch with an increase in elapsed time in a process of switching the bypass switch from the ON-state to the OFF-state, and to decrease the current flowing thorough the bypass switch with an increase in elapsed time in a process of switching the bypass switch from the ON-state to the OFF-state, by means of an amplification action of the bypass switch.

6. The lighting device of claim 1, wherein:
the controller is configured to, during a predetermined time period after switching the bypass switch between the ON-state and the OFF-state, compare the measured voltage of the voltage meter with a fifth threshold voltage, and stop the operation of the power converter when determining that the measured voltage is equal to or greater than the fifth threshold voltage; and
the fifth threshold voltage is larger than the second threshold voltage but smaller than the first threshold voltage.

7. The lighting device of claim 6, wherein:
the controller is configured to linearly change the fifth threshold voltage between the first threshold voltage and the second threshold voltage with an increase in elapsed time after switching the bypass switch between the ON-state and the OFF-state.

8. The lighting device of claim 1, wherein:
the first rated voltage is defined by a sum of a rated voltage of the first light source and a rated voltage of the second light source; and
the second rated voltage is defined by the rated voltage of the first light source.

9. The lighting device of claim 1, wherein:
the first light source is constituted by a first series circuit of LEDs and has a first forward voltage;
the second light source is constituted by a second series circuit of LEDs and has a second forward voltage;
the first rated voltage is defined by a sum of the first forward voltage and the second forward voltage; and
the second rated voltage is defined by the first forward voltage.

10. The lighting device of claim 1, further comprising a signal input terminal for receiving a first instruction signal and a second instruction signal, wherein:

the controller is configured to
- keep the bypass switch in the OFF-state while the signal input terminal receives the first instruction signal, and
- keep the bypass switch in the ON-state while the signal input terminal receives the second instruction signal.

11. The lighting device of claim 1, wherein:

the DC-DC converter includes a switching element;

the controller further includes a current meter configured to measure a current supplied from the power converter to the DC light source, and to output a measured current;

the controller is configured to control a switching operation of the switching element such that the measured current of the current meter is equal to a predetermined target value; and the controller is configured to
- while keeping the bypass switch in the OFF-state, stop the operation of the power converter by turning off the switching element when determining that the measured voltage is equal to or greater than the first threshold voltage, and
- while keeping the bypass switch in the ON-state, stop the operation of the power converter by turning off the switching element when determining that the measured voltage is equal to or greater than the second threshold voltage.

12. The lighting device of claim 11, wherein:

the power converter further includes
- an inductor for storing therein energy in response to supply of electric power from an external DC power source while the switching element is turned on, and
- a capacitor to be charged by a regeneration current from the inductor while the switching element is turned off;

the controller is configured to generate a primary current instruction value based on the measured current of the current meter and the target value; and the controller is configured to
- turn off the switching element when a primary current flowing through the switching element reaches the primary current instruction value, and
- turn on the switching element when the regeneration current reaches zero or when a predetermined suspension time elapses from a time when the switching element is turned on last time.

13. A headlight, comprising:

the lighting device of claim 1;

a DC light source to be lit by electric power supplied from the lighting device; and a housing that houses the DC light source.

14. A vehicle, comprising:

the headlight of claim 13; and a vehicle body in which the headlight is installed.

* * * * *